(12) United States Patent
Callahan et al.

(10) Patent No.: US 10,100,240 B2
(45) Date of Patent: Oct. 16, 2018

(54) ELECTROSTATIC DISSIPATIVE COMPOSITIONS AND METHODS THEREOF

(71) Applicant: THE BOEING COMPANY, Chicago, IL (US)

(72) Inventors: Rebecca A. Callahan, St. Louis, MO (US); Patrick J. Kinlen, Fenton, MO (US); Eric A. Bruton, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 14 days.

(21) Appl. No.: 15/252,029

(22) Filed: Aug. 30, 2016

(65) Prior Publication Data

US 2018/0057722 A1  Mar. 1, 2018

(51) Int. Cl.

| | |
|---|---|
| *B05D 1/00* | (2006.01) |
| *B05D 3/14* | (2006.01) |
| *C09K 3/16* | (2006.01) |
| *B05D 1/02* | (2006.01) |
| *C09D 5/24* | (2006.01) |
| *C09D 133/08* | (2006.01) |
| *C09D 153/00* | (2006.01) |
| *C09D 163/00* | (2006.01) |
| *C09D 165/00* | (2006.01) |
| *C09D 175/04* | (2006.01) |
| *C09D 179/02* | (2006.01) |

(Continued)

(52) U.S. Cl.
CPC ............... *C09K 3/16* (2013.01); *B05D 1/005* (2013.01); *B05D 1/02* (2013.01); *B05D 3/14* (2013.01); *C08K 5/42* (2013.01); *C08L 33/08* (2013.01); *C08L 65/00* (2013.01); *C08L 79/02* (2013.01); *C09D 5/24* (2013.01); *C09D 133/06* (2013.01); *C09D 133/08* (2013.01); *C09D 153/00* (2013.01); *C09D 163/00* (2013.01); *C09D 165/00* (2013.01); *C09D 175/04* (2013.01); *C09D 179/02* (2013.01)

(58) Field of Classification Search
CPC . C09K 3/16; B05D 1/005; B05D 1/02; B05D 3/14; C09D 5/24; C09D 133/08; C09D 153/00; C09D 163/00; C09D 175/04; C09D 179/02
USPC ........................................................ 427/352
See application file for complete search history.

(56) References Cited

U.S. PATENT DOCUMENTS 5,716,550 A    2/1998  Gardner et al.
5,780,572 A *  7/1998  Graham ................ H01B 1/128
                                                252/500

(Continued)

OTHER PUBLICATIONS

M.R. Mahmoudian, et al., Effect of narrow diameter polyaniline nanotubes and nanofibers in polyvinyl butyral coating on corrosion protective performance of mild steel, Progress in Organic Coatings, vol. 75, Issue 4, Dec. 2012, pp. 301-308.

(Continued)

*Primary Examiner* — Alexander Marion Weddle
(74) *Attorney, Agent, or Firm* — Patterson + Sheridan, LLP

(57) ABSTRACT

Compositions of the present disclosure comprise electrostatic dissipative compositions comprising a first polymer, a second polymer, and a naphthyl sulfonic acid. Methods of the present disclosure comprise heating a vehicle component by applying a voltage to a surface of a composition disposed on a vehicle component. The composition comprises a first polymer and a second polymer.

37 Claims, 7 Drawing Sheets

(51) Int. Cl.
    *C09D 133/06*    (2006.01)
    *C08K 5/42*      (2006.01)
    *C08L 33/08*     (2006.01)
    *C08L 65/00*     (2006.01)
    *C08L 79/02*     (2006.01)

(56) References Cited

U.S. PATENT DOCUMENTS

| | | |
|---|---|---|
| 5,910,385 A | 6/1999 | Gardner et al. |
| 6,310,133 B1 | 10/2001 | Katashima et al. |
| 6,577,358 B1 | 6/2003 | Arakawa et al. |
| 2007/0054577 A1* | 3/2007 | Avloni ............... D06M 10/025 |
| | | 442/110 |
| 2014/0363291 A1 | 12/2014 | Gaillardon et al. |

OTHER PUBLICATIONS

Qianqian Lin, et al., Highly sensitive and ultrafast response surface acoustic wave humidity sensor based on electrospun polyaniline/poly(vinyl butyral) nanofibers, Analytica Chimica Acta, vol. 748, Oct. 20, 2012, pp. 73-80.

T. Pan, et al, A polyaniline based intrinsically conducting coating for corrosion protection of structural steels, Microsc Res Tech Nov. 2013; 76(11), pp. 1186-1195.

Jae-Woo Kim, et al., Polyaniline/Carbon Nanotube Sheet Nanocomposites: Fabrication and Characterization, ACS Appl. Mater. Interfaces, 2013, 5 (17), pp. 8597-8606.

* cited by examiner $R_A = V_{43}/I_{12}$ $R_A = V_{14}/I_{23}$

ELECTROSTATIC DISSIPATIVE COMPOSITIONS AND METHODS THEREOF

FIELD

Aspects of the present disclosure comprise electrostatic dissipative compositions and methods of making and use thereof.

BACKGROUND

A surface of a vehicle, such as an aircraft, in motion builds static charge. For example, an aircraft has one or more radars located behind the nose of the aircraft. The nose may build a form of static electricity known as precipitation static (P-static).

Surface coatings may be applied to aircraft components to protect surfaces of the aircraft components. However, conventional surface coating(s) of vehicle components of an aircraft are typically not highly conductive, having resistivity of hundreds of kOhms to tens of MegaOhms. Accordingly, conventional surface coatings of an aircraft can allow charge buildup on surfaces (and other components) of the aircraft. In addition to an inability to dissipate charge buildup, conventional coatings might not have ideal properties. For example, performance as to durability parameters such as rain erosion, resistance to UV light, resistance to high temperature, resistance to low temperature, and resistance to sand and hail damage might not be ideal for conventional surface coatings on a surface of a vehicle exposed to extreme conditions. Furthermore, for coatings of a canopy of a fighter jet and/or windshield/window of a commercial aircraft or fighter jet, the coatings should be substantially clear to promote visibility through the surfaces. Conventional surface coatings often have low visible light transmittance.

In addition, if a conventional surface coating is mixed with additional chemicals to improve one or more desired physical properties of the coating, the coating is often incompatible with the additional chemicals, negating desired physical properties provided by the additional chemicals added to the coating. Conventional surface coatings are also often incompatible with underlying surfaces/coatings leading to adhesion degradation at the coating-coating interface.

In addition, cold weather conditions promote buildup of ice on vehicle surfaces. To remove ice, chemicals are often sprayed onto the ice to promote melting. The chemicals are a cost burden on a user of the vehicle.

What is needed are compositions that are both conductive and otherwise airworthy and methods of making and using the compositions.

SUMMARY

In at least one aspect, an electrostatic dissipative composition comprises a first polymer, a second polymer, and a naphthyl sulfonic acid.

In at least one aspect, an electrostatic dissipative composition comprises one or more reaction products of a first polymer in a solvent at a percent solids of between about 0.1 wt % and about 30 wt %, a polyol, an isocyanate, and a sulfonic acid.

In at least one aspect, a method of forming an electrostatic dissipative composition comprises mixing a first polymer and a second polymer to form a first composition. The method comprises depositing the first composition onto a substrate and curing the first composition.

In at least one aspect, a method of heating a vehicle component comprises applying a voltage to a surface of a composition disposed on a vehicle component. The composition is made of a first polymer and a second polymer.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
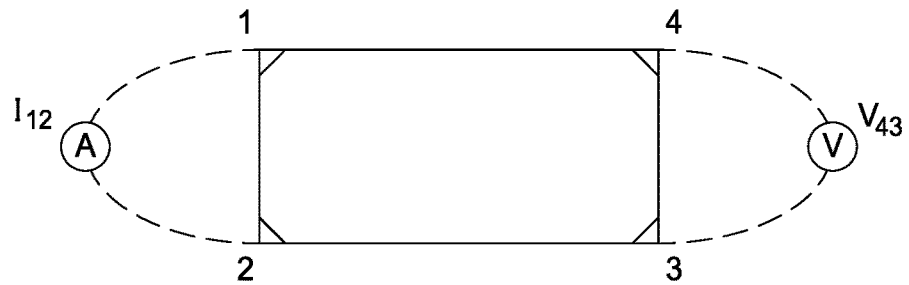
FIG. 1 illustrates possible electrode arrangements for resistance measurements, according to some aspects of the present disclosure.
Figure 1:
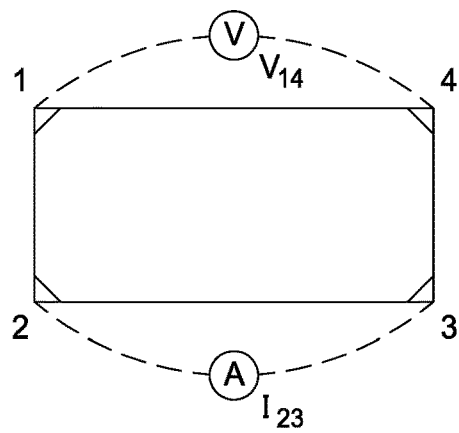

The present disclosure relates to electrostatic dissipative compositions useful for components subjected to static buildup in use. The electrostatic dissipative compositions generally include high conductivity in addition to other ideal airworthiness properties. As one example, an electrostatic dissipative composition is made of a first polymer, a second polymer, and a naphthyl sulfonic acid (DNNSA). The first polymer is a polyaniline (PANI), a poly(ethylenedioxythiophene) (PEDOT), a poly(styrenesulfonate) (PSS), or mixtures thereof. The first polymer may be a polyaniline. The polyaniline comprises between about 0.1 weight percent (wt %) and about 25 wt % of the composition. In at least one aspect, a composition comprises between about 20 wt % and about 80 wt % of a first polymer, such as about 40 wt % and about 60 wt %, for example about 40 wt %, about 45 wt %, about 50 wt %, about 55 wt %, about 60 wt %. The first polymer may be a mixture of a poly(ethylenedioxythiophene) and a poly(styrenesulfonate), and the mixture may be between about 1 wt % and about 50 wt % of the composition, such as between about 10 wt % and about 25 wt %, for example 10 wt %, 15 wt %, 20 wt %, 25 wt %.

The second polymer is a polyurethane, a polyvinyl butyral, a polyacrylate, an epoxy, a glycidyl-Si—Zr-containing solgel, a polyester, a phenoxy resin, a polysulfide, mixtures thereof, or salts thereof. A second polymer comprises unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I). As used herein, "unsubstituted" includes a molecule having a hydrogen atom at each position on the molecule that would otherwise be suitable to have a substituent. As used herein, "substituted" includes a molecule having a substituent other than hydrogen that is bonded to, for example, a carbon or nitrogen atom. In at least one aspect, a composition is made of between about 20 wt % and about 80 wt % of a second polymer, such as between about 40 wt % and about 60 wt %, for example about 40 wt %, about 45 wt %, about 50 wt %, about 55 wt %, about 60 wt %. The second polymer comprises a polyurethane or a polyvinyl butyral. The polyvinyl butyral may comprise between about 10 wt % and about 40 wt % of the composition, such as between about 10 wt % and about 25 wt %, for example 10 wt %, 15 wt %, 20 wt %, 25 wt %.

The naphthylsulfonic acid decreases resistivity of an electrostatic dissipative composition of the present disclosure. The naphthylsulfonic acid may be of the Formula (I):

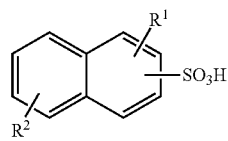

Each benzene ring of Formula (I) is unsubstituted, monosubstituted, disubstituted, trisubstituted, or tetrasubstituted with $R^1$ or $R^2$, as appropriate. Each instance of $R^1$ is independently selected from alkyl (e.g., C1-C20 alkyl), aryl, amino, nitro, and halo (—F, —Cl, —Br, —I), and each instance of $R^2$ is independently selected from alkyl (e.g., C1-C20 alkyl), aryl, amino, nitro, and halo (—F, —Cl, —Br, —I). C1-C20 alkyl substituted naphthylsulfonic acid may be dinonylnaphthylsulfonic acid, methylnaphthylsulfonic acid, ethylnaphthylsulfonic acid, propylnaphthylsulfonic acid, butylnaphthylsulfonic acid, pentylnaphthylsulfonic acid, hexylnaphthylsulfonic acid, heptylnaphthylsulfonic acid, octylnaphthylsulfonic acid, nonylnaphthylsulfonic acid, decylnaphthylsulfonic acid, dimethylnaphthylsulfonic acid, diethylnaphthylsulfonic acid, dipropylnaphthylsulfonic acid, dibutylnaphthylsulfonic acid, dipentylnaphthylsulfonic acid, dihexylnaphthylsulfonic acid, diheptylnaphthylsulfonic acid, dioctylnaphthylsulfonic acid, didecylnaphthylsulfonic acid, or isomers thereof.

| Chemical Name | Non-limiting Example Chemical Structures |
|---|---|
| dinonylnaphthylsulfonic acid | |
| methylnaphthylsulfonic acid | |
| ethylnaphthylsulfonic acid | |

| Chemical Name | Non-limiting Example Chemical Structures |
|---|---|
| propylnaphthylsulfonic acid | CH₃—(CH₂)₂—naphthyl—SO₃H (2-substituted) |
| | CH₃—(CH₂)₂—naphthyl—SO₃H (1-substituted) |
| | (CH₃)₂CH—naphthyl—SO₃H (2-substituted) |
| | (CH₃)₂CH—naphthyl—SO₃H (1-substituted) |
| butylnaphthylsulfonic acid | CH₃—(CH₂)₃—naphthyl—SO₃H (2-substituted) |
| | CH₃—(CH₂)₃—naphthyl—SO₃H (1-substituted) |
| | (CH₃)₂CH—(CH₂)₂—naphthyl—SO₃H (2-substituted) |
| | (CH₃)₂CH—(CH₂)₂—naphthyl—SO₃H (1-substituted) |
| pentylnaphthylsulfonic acid | CH₃—(CH₂)₄—naphthyl—SO₃H (2-substituted) |
| | CH₃—(CH₂)₄—naphthyl—SO₃H (1-substituted) |
| | (CH₃)₂CH—(CH₂)₃—naphthyl—SO₃H (2-substituted) |
| | (CH₃)₂CH—(CH₂)₃—naphthyl—SO₃H (1-substituted) |
| hexylnaphthylsulfonic acid | CH₃—(CH₂)₅—naphthyl—SO₃H (2-substituted) |
| | CH₃—(CH₂)₅—naphthyl—SO₃H (1-substituted) |
| | (CH₃)₂CH—(CH₂)₄—naphthyl—SO₃H (2-substituted) |
| | (CH₃)₂CH—(CH₂)₄—naphthyl—SO₃H (1-substituted) |
| heptylnaphthylsulfonic acid | CH₃—(CH₂)₆—naphthyl—SO₃H (2-substituted) |
| | CH₃—(CH₂)₆—naphthyl—SO₃H (1-substituted) |
| | (CH₃)₂CH—(CH₂)₅—naphthyl—SO₃H (2-substituted) |

| Chemical Name | Non-limiting Example Chemical Structures |
|---|---|
| | 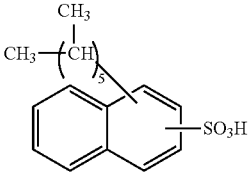 |
| octylnaphthylsulfonic acid | 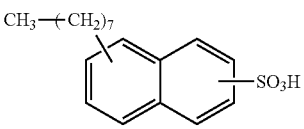 |
| nonylnaphthylsulfonic acid | 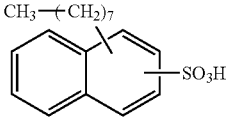 |
| decylnaphthylsulfonic acid | 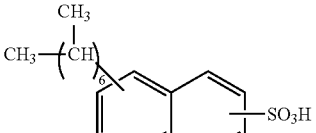 |
| Chemical Name | Non-limiting Example Chemical Structures |
|---|---|
| | 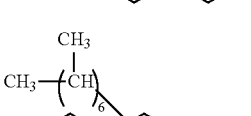 |
| dimethylnaphthylsulfonic acid | 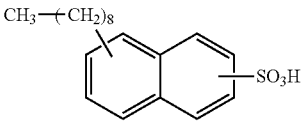 |
| diethylnaphthylsulfonic acid | 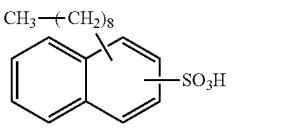 |
| dipropylnaphthylsulfonic acid | 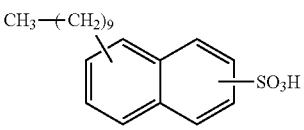 |

| Chemical Name | Non-limiting Example Chemical Structures |
|---|---|
| | 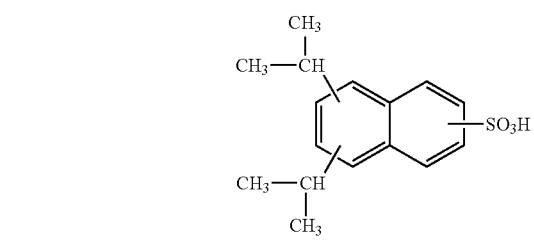 |
| | 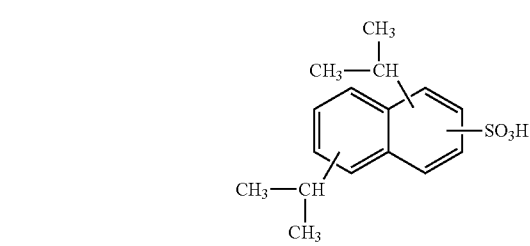 |
| dibutylnaphthylsulfonic acid | 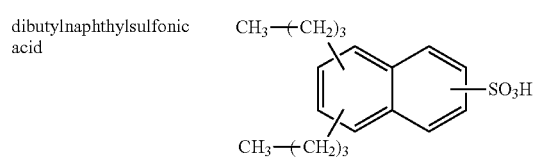 |
| | 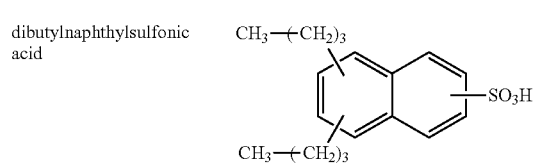 |
| | 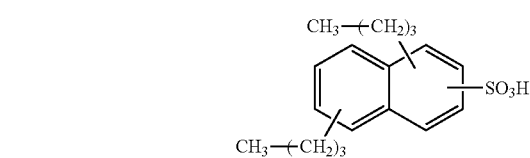 |
| | 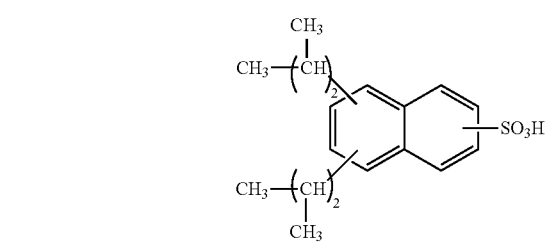 |
| dipentylnaphthylsulfonic acid | 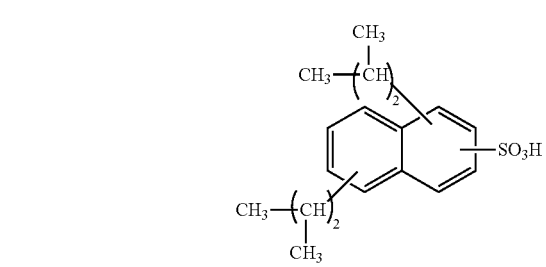 |
| Chemical Name | Non-limiting Example Chemical Structures |
|---|---|
| | 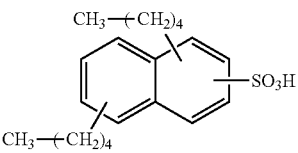 |
| | 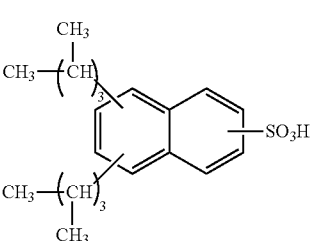 |
| | 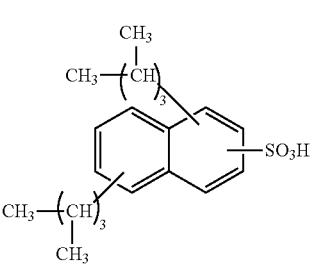 |
| dihexylnaphthylsulfonic acid | 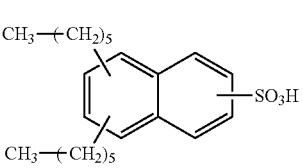 |
| | 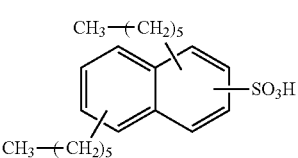 |
| | 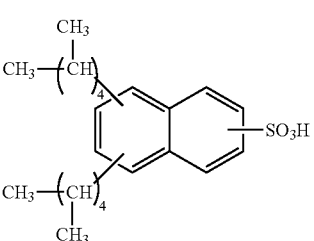 |
| | 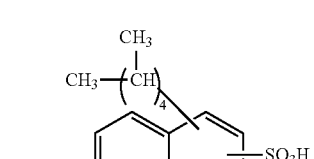 |

| Chemical Name | Non-limiting Example Chemical Structures |
|---|---|
| diheptylnaphthylsulfonic acid | 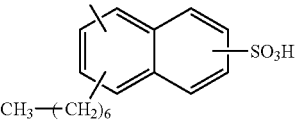 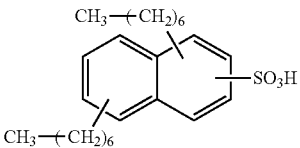 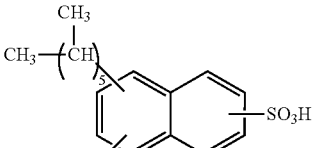 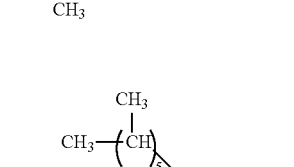 |
| dioctylnaphthylsulfonic acid | 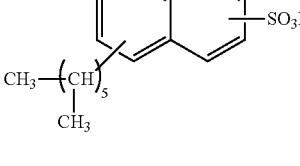 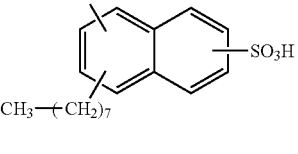 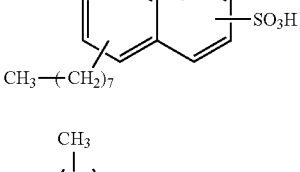 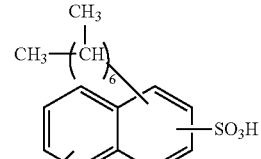 |
| didecylnaphthylsulfonic acid | 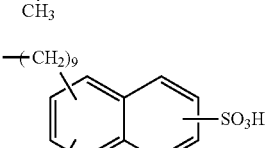 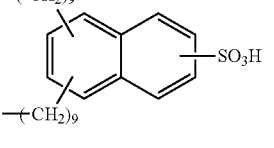 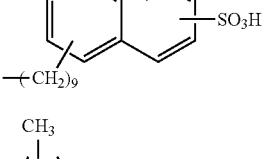 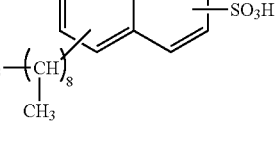 |

An electrostatic dissipative composition comprises a naphthylsulfonic acid between about 1 wt % and about 50 wt %, such as between about 3 wt % and about 25 wt %, such as between about 10 wt % and about 15 wt %, for example 5 wt %, 10 wt %, 15 wt %. Other sulfonic acids comprise phenyl sulfonic acids, anthracenyl sulfonic acids, pyrenyl sulfonic acids, each of which is unsubstituted, monosubtituted or multiplysubstituted, where each instance of substitution is independently alkyl (e.g., C1-C20 alkyl), aryl, amino, nitro, or halo (—F, —Cl, —Br, —I).

In at least one aspect, a substrate comprises a component, such as a vehicle component, and one or more compositions of the present disclosure disposed onto the component. Compositions disposed on a substrate (e.g., as a layer) are applied between about 0.1 μm and about 100 μm in thickness, such as between about 1 μm and about 8 μm, such as between about 2 μm and about 6 μm, for example about 0.1 μm, about 1 μm, about 2 μm, about 3 μm, about 4 μm, about 5 μm, about 6 μm, about 7 μm, about 8 μm, about 9 μm, about 10 μm. In at least one aspect, compositions have a resistance of between about 1e+4Ω/□ and about 1e+8Ω/□, for example about 1e+4Ω/□, about 1e+5Ω/□, about 1e+6Ω/□, about 1e+7Ω/□, about 1e+8Ω/□. Conductivity provides electrostatic dissipation. Compositions may have a visible light transmittance of greater than about 50%, for example about 55%, about 60%, about 65%, about 70%, about 75%, about 80%, about 85%, about 90%, about 95%. Increased visible light transmittance provides a clear composition for use as a coating on a canopy, windshield, and/or window. Visible light transmittance of compositions of the present disclosure may be determined using any suitable visible light transmittance spectrometer, such as a Carey 5000 UV-VIS-NIR spectrophotometer.

In addition to aspects described above, compositions comprise a fiber material that is graphite, fiberglass, nylon, aramid polymers, polyethylenes, or mixtures thereof.

A vehicle comprises any suitable transportation device. Vehicles include, but are not limited to, aircraft, automobiles, boats, motorcycles, satellites, rockets, missiles, etc., and therefore further include manned and unmanned aircraft, manned and unmanned spacecraft, manned and unmanned terrestrial vehicles, manned and unmanned non-terrestrial vehicles, and even manned and unmanned surface and sub-surface water-borne marine vehicles, objects, and structures.

A vehicle component may comprise one or more compositions of the present disclosure disposed on one or more surfaces of the vehicle component. Compositions comprise a first polymer, a second polymer, and a sulfonic acid. The first polymer and/or the second polymer is electrically conductive. A vehicle component includes, but is not limited to, any component of a vehicle, such as a structural component, such as a panel or joint, of an aircraft, automobile, etc. A vehicle component comprises a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

An electrostatic dissipative composition comprises one or more reaction products of a first polymer in a solvent at a percent solids of between about 0.1 wt % and about 30 wt %, a polyol, an isocyanate, and a sulfonic acid. In at least one aspect, a polymer is present in a solvent to a % solids of between about 0.1 wt % and about 30 wt %, such as between about 1 wt % and about 15 wt %, for example about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %. The first polymer comprises a polyaniline, a poly(ethylenedioxythiophene), a poly(styrenesulfonate), or mixtures thereof. The solvent comprises a xylene, a benzene, a toluene, dimethyl sulfoxide, water, or mixtures thereof. The sulfonic acid may be a napthyl sulfonic acid.

In at least one aspect, a method for forming an electrostatic dissipative composition comprises mixing a first polymer and a second polymer to form a first composition. The method comprises depositing the first composition onto a substrate. The substrate may be a vehicle component, and the first composition may have a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method comprises curing the first composition. The method may comprise dissolving the first polymer in a solvent before mixing the first polymer with the second polymer. The solvent comprises a xylene, a benzene, a toluene, dimethyl sulfoxide, water, or mixtures thereof.

The method may comprise rinsing the first composition with a rinsing agent. The rinsing agent comprises isopropyl alcohol, p-Toluenesulfonic acid, acetone, methanol, hydrates thereof, solvates thereof, or mixtures thereof. Rinsing may comprise spraying the rinsing agent onto a surface of the first composition for between about 1 second and about 10 minutes, such as between about 1 minute and 5 minutes. Rinsing may comprise spraying the rinsing agent onto a surface of a composition of an amount of between about 1 mL and about 25 kL, such as between about 1 L and about 100 L, such as between about 1 L and about 5 L, for example 1 L, 2 L, 3 L, 4 L, 5 L. Rinsing may comprise rinsing the first composition with a second rinsing agent that is isopropyl alcohol, p-Toluenesulfonic acid, acetone, methanol, hydrates thereof, solvates thereof, or mixtures thereof. In at least one aspect, the rinsing agent is p-Toluene sulfonic acid and is a mixture of 1 wt % p-Toluenesulfonic acid in butoxyethanol. The rinsing agent may be a mixture of dinonylnaphthyl sulfonic acid and isopropylalcohol. In at least one aspect, rinsing comprises dipping the first composition into the rinsing agent for between about 1 second and about 1 minute.

Curing the first composition may comprise raising the temperature of the composition to a peak curing temperature and maintaining the peak curing temperature for between about 1 second and about 48 hours, such as between about 1 hour and about 10 hours. The peak curing temperature is between about room temperature and about 200° C., such as between about 50° C. and about 90° C., for example 50° C., 60° C., 70° C., 80° C., 90° C.

Depositing the first composition onto the substrate may be achieved by spin-coating the first composition onto a surface of a substrate, such as a vehicle component, at a rate of between about 100 rpm and about 4,000 rpm, such as between about 500 rpm and about 2,000 rpm, for example about 500 rpm, about 1,000 rpm, about 1,500 rpm, about 2,000 rpm.

Alternatively, depositing the first composition onto the substrate is achieved by spraying the first composition onto a surface of a substrate, such as a vehicle component using any suitable composition spray apparatus.

In at least one aspect, a method of heating a vehicle component comprises applying a voltage to a surface of a composition disposed on a vehicle component. The composition is made of a first polymer, a second polymer, and a sulfonic acid. Applying the voltage to the surface of the composition at least partially melts solid water (ice) disposed on a surface of the vehicle component. The voltage can be an alternating current (AC) voltage of between about 10 Hertz and about 2000 Hertz, such as between about 500 Hertz and about 1,000 Hertz, for example 500 Hertz, 600 Hertz, 700 Hertz, 800 Hertz, 900 Hertz. The voltage can be an alternating current (AC) voltage of between about 10 volts and about 2000 volts, such as between about 100 volts and about 500 volts, for example 100 volts, 200 volts, 300 volts, 400 volts, 500 volts.

The vehicle component comprises a nose, a fuel tank, a tail cone, a panel, a coated lap joint between two or more panels, a wing-to-fuselage assembly, a structural aircraft composite, a fuselage body-joint, a wing rib-to-skin joint, and/or other internal component. The first polymer comprises a polyaniline, a poly(ethylenedioxythiophene), a poly(styrenesulfonate), or mixtures thereof, and the second polymer comprises a polyurethane, a polyvinyl butyral, a polyacrylate, an epoxy, a glycidyl-Si—Zr-containing solgel, a polyester, a phenoxy resin, a polysulfide, and mixtures thereof.

Compositions of the present disclosure can be deposited onto a substrate, such as a surface of a vehicle component, by any suitable deposition method, such as dipping, spraying, brush coating, spin coating, roll coating, doctor-blade coating, or mixtures thereof. Compositions of the present disclosure can be deposited onto one or more surfaces of a vehicle component, such as an inner surface (e.g., inner cavity), an outer surface, or both, of an aircraft component.

Compositions of the present disclosure comprise an electrostatic dissipative composition comprising a first polymer, a second polymer, and a sulfonic acid. First polymers comprise polyanilines (PANIs), poly(ethylenedioxythiophene)s (PEDOTs), poly(styrenesulfonate)s (PSSs), and mixtures thereof. Second polymers comprise polyurethanes, polyvinyl butyrals, acrylates, epoxies, glycidyl-Si—Zr-containing solgels, thermoplastics such as polyesters, resins such as phenoxy resins, sealants such as polysulfides, and mixtures thereof. Epoxies comprise partially cured epoxies, a particular addition of epoxies, two-component epoxy resin that includes a catalyst (such as HYSOL® EA 956 epoxy resin available from Henkel Corporation of Bay Point, Calif.), a two liquid system that includes both a resin and a hardener (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable.

Polyanilines comprise, for example, a polyaniline of Formula (II):

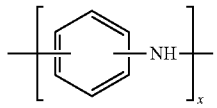

(where x is a positive integer, such as between about 10 and about 10,000), leucoemeraldine, emeraldine, and (per) nigraniline, mixtures thereof, salts thereof, and/or bases thereof. Polyanilines comprise unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Poly(ethylenedioxythiophene)s comprise, for example, a poly(ethylenedioxythiophene) of Formula (III):

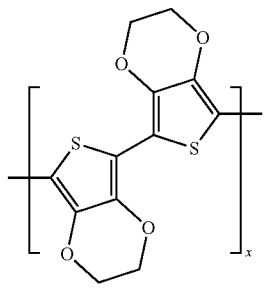

(where x is a positive integer, such as between about 10 and about 10,000) and/or salts thereof. Poly(ethylenedioxythiophene)s comprise unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Poly(styrenesulfonate)s comprise, for example, a poly(styrenesulfonate) of Formula (IV):

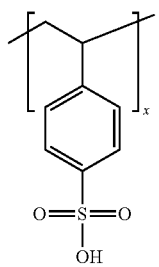

(where x is a positive integer, such as between about 10 and about 10,000) and/or salts thereof. Poly(styrenesulfonate)s comprise unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Acrylates comprise, for example, a polyacrylate of Formula (V):

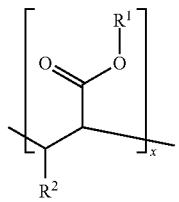

(where x is a positive integer, such as between about 10 and about 10,000) and/or salts thereof. $R^1$ and $R^2$ is independently C1-C20 alkyl or C1-C20 hydroxyalkyl. In at least one aspect, $R^2$ is methyl. Acrylates comprise hydroxyalkyl polyacrylates, hydroxyalkyl polymethacrylates, alkyl polyacrylates, and alkyl polymethacrylates. Examples of suitable hydroxyalkyl polyacrylates, or hydroxyalkyl polymethacrylates comprise poly(2-hydroxyethyl acrylate), poly(2-hydroxy-1-methylethyl acrylate), poly(2-hydroxypropyl acrylate), poly(3-hydroxypropyl acrylate), poly(2-hydroxybutyl acrylate), poly(4-hydroxybutyl acrylate), poly(2-hydroxyethyl methacrylate), poly(2-hydroxy-1-methylethyl methacrylate), poly(2-hydroxypropyl methacrylate), poly(3-hydroxypropyl acrylate), poly(2-hydroxybutyl methacrylate), poly(4-hydroxybutyl methacrylate) and the like, and acrylic add or methacrylic acid esters of ethylene glycol and propylene glycol such as poly(diethylene glycol acrylate), and the like. Also useful are hydroxy-containing esters and/or amides of unsaturated acids such as maleic acid, fumaric acid, itaconic acid, and the like. In at least one aspect, a hydroxy-acrylic polymer comprises from 5 percent to 35 percent by weight of monoethylenically unsaturated hydroxy-containing monomers based on total monomer weight, and in certain embodiments from 10 percent to 25 percent by weight. Examples of suitable alkyl polyacrylates and polymethacrylates comprise poly(methyl acrylate), poly(ethyl acrylate), poly(propyl acrylate), poly(isopropyl acrylate), poly(butyl acrylate), poly(isobutyl acrylate), poly(hexyl acrylate), poly(2-ethylhexyl acrylate), poly(nonyl acrylate), poly(lauryl acrylate), poly(stearyl acrylate), poly(cyclohexyl acrylate), poly(isodecyl acrylate), poly(phenyl acrylate), poly(isobornyl acrylate), poly(methyl methacrylate), poly(ethyl methacrylate), poly(propyl methacrylate), poly(isopropyl methacrylate), poly(butyl methacrylate), poly(isobutyl methacrylate), poly(hexyl methacrylate), poly(2-ethylhexyl methacrylate), poly(nonyl methacrylate), poly(lauryl methacrylate), poly(stearyl methacrylate), poly(cyclohexyl methacrylate), poly(isodecyl methacrylate), poly(phenyl methacrylate), poly(isobornyl methacrylate), and the like.

Polyurethanes comprise, for example, a polyurethane of Formula (VI):

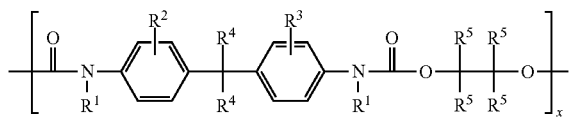

(where x is an integer between about 10 and about 10,000). Each instance of $R^1$, $R^2$, $R^3$, $R^4$, and $R^5$ is independently hydrogen or C1-C20 alkyl. Polyurethanes comprise, for example, Aptek 2100 A/B and Aerodur 3002 (available from Argosy International, Inc.). Polyurethanes comprise unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Polymer Syntheses, Characterization, and Property Measurements

Polymers of the compositions of the present disclosure may be commercially available or may be synthesized. Commercially available polymers comprise PANI, PEDOT:PSS, polyurethanes, or epoxies, and may be obtained from, for example, Heraeus or SigmaAldrich. Polymers of the present disclosure may be synthesized by mixing a plurality of monomers to form a mixture, followed by applying heat to polymerize the monomers. One or more polymerization catalysts may be added to a mixture to promote increased molecular weight (Mn and/or Mw) of a formed polymer. "Mn" is a number average molecular weight, and "Mw" is a weight average molecular weight. In at least one aspect, polymers are synthesized in any suitable solvent or solvent mixture, for example, n-butanol, n-hexanol, diethyl ether, or mixtures thereof.

When compositions of the present disclosure comprise DNNSA, the polyaniline, for example, produced has a high molecular weight (e.g., >22,000) and a moderate conductivity (10-5 S/cm) and exhibits high solubility in a variety of solvents. In at least one aspect, the conductivity of compositions of the synthesized polymers may be enhanced by about 5 orders of magnitude by treatment/rinsing with quaternary ammonium salts or solvents such as methanol, acetone, isopropyl alcohol, p-toluenesulfonic acid, salts thereof, and mixtures thereof. Without being bound by theory, conductivity increases with rinsing due to removal of excess DNNSA, densification of the polymer, and a resultant increase in crystallinity.

Example Preparation of Polyaniline Dinonylnaphthalenesulfonic Acid Salt.

One tenth of a mole of DNNSA (as a 50% w/w solution in 2-butoxyethanol) was mixed with 0.06 mol of aniline and 200 mL of water to form a milky white emulsion with 2-butoxyethanol. The emulsion was chilled to 5° C., mechanically stirred, and blanketed with nitrogen. Ammonium peroxydisulfate (0.074 mol in 40 mL of water) was added dropwise to the mixture over a period of about 1 hour. The reaction was allowed to proceed for about 17 hours, during which time the emulsion separated into a green 2-butoxyethanol phase and a colorless aqueous phase. The progress of the synthesis was monitored by pH, OCP (open circuit potential, mV), and temperature.

The organic phase was washed three times with 100-mL portions of water, leaving a dark green, highly concentrated polyaniline phase in 2-butoxyethanol. This concentrate was soluble in xylene, from which thin compositions may be cast. Addition of acetone to a portion of the above concentrate resulted in the precipitation of the polyaniline salt as a green powder. After thorough washing of the powder with acetone and drying, elemental analysis indicated a stoichiometric ratio of sulfonic acid to aniline of 1:2.

The molar ratios of PANI:DNNSA in the synthesized polymers may be differed by adjusting the molar ratio of aniline to DNNSA in the starting mixture. For example, PANI:DNNSA salts may be prepared using DNNSA/aniline molar ratios of 1:1, 1:2, and 1:5 while the peroxydisulfate/aniline mole ratio may be kept constant at 1.23:1. DNNSA to Aniline mole ratio of 1.7 provides an Mw(SEC/viscosity) value of 31,250. DNNSA to Aniline mole ratio of 0.5 provides an Mw(SEC/viscosity) value of 25,300. DNNSA to Aniline mole ratio as low as 0.2 provides an Mw(SEC/viscosity) value of 5,690.

Molecular Weight Determinations.

Molecular weight distribution averages may be determined by size exclusion chromatography (SEC). Chromatograms may be obtained with SEC systems, such as a model 150-CV SEC/viscometry (SEC/VISC) system (Waters Chromatography Inc.) and a multicomponent SEC system (Waters Chromatography Inc.) assembled from a model 590 pump, a model 712 autoinjector, a model 410 differential refractive index detector, and a model TCH column heater. Both SEC systems may be operated at 45° C. and employ a bank of two styragel SEC columns (Waters Chromatography Inc.) with mean permeabilities of 105 and 103 Å. UV-grade N-methylpyrolidone (NMP) (Burdick & Jackson Co.) modified with 0.02 M $NH_4HCO_2$ (Fluka Chemical Co.) may be used as the mobile phase and polymer solvent. A flow rate setting of 0.5 mL/min may be employed.

Calibration of the SEC may be performed with monodisperse polystyrene standards (Toya Soda Inc.) ranging in molecular weight from $1.1 \times 10^6$ to 2698. Intrinsic viscosities of the polystyrene calibrants may be measured using the SEC/viscometric detector. These values provide the Mark-Houwink expression for polystyrene in NMP/0.02 M $NH_4HCO_2$ at 45° C. for calibrating the size-exclusion chromatograph according to universal calibration:

$$[\eta](dL/g) = (1.947 \times 10^{-4}) M^{0.66}$$

A linear least-squares fitting may be used to generate a universal calibration curve or a polystyrene-based molecular weight calibration curve.

Mark-Houwink constants for polyaniline may be determined from the set molecular weight distribution averages and intrinsic viscosities calculated for individual data points of SEC/VISC chromatograms. Data acquisition and reduction may be provided by TRISEC software (Viscotek Corp.). Reported molecular weight distribution averages may be means of two determinations.

The SEC/VISC chromatograms for deprotonated polyaniline salts are typically unimodal, and nearly baseline resolution of the PANI and its sulfonic acid component is observed. The sulfonic acid components separate from the polyaniline peak and are not included in the molecular weight calculations. In at least one aspect, the polyaniline salts produce broad size-exclusion chromatograms, with Mw/Mn (polydispersity)>1.5. A Mark-Houwink (M-H) plot for PANI-DNNSA (1:2) is linear with R=0.671 and log K=−3.146.

Absorption.

Absorption measurements may be made on a Cary 5000 spectrometer with the Universal Measurement Attachment (UMA) in air. Solution samples may be measured in a dilute solution of toluene in a 1 cm quartz cuvette. Sample rate may be between 1 nm and 2 nm depending on the breadth of wavelengths being studied. Solvent background should be obtained prior to sample measurement and later removed. Dry film measurements may be measured as spin-coated samples on glass slides, spin rate 1000 rpm for 30 s from solutions of xylene or toluene. A background transmission taken on a glass substrate should be measured. Samples should be oriented with the glass substrate side towards the light inlet, to minimize light scattering effects from uneven sample surfaces.

Resistance.

Resistance measurements may be made using any suitable set of electrodes and measurement apparatus, such as a Keithley 4200 SCS. Preferably, resistance measurements are made using the van der Pauw method. The four-point method uses parallel source and sense measurements of current and voltage, respectively, across a sample surface. Current and voltage polarities are switched across each junction to test for ambipolarity. Sample geometry should be held constant and allows for the direct comparison of samples. In order to account for differences in the charge directionality, the current and voltage measurements are rotated across each possible arrangement, as shown in Table 1 and FIG. 1. FIG. 1 illustrates possible electrode arrangements for resistance measurements.

TABLE 1

Possible electrode arrangements for resistance measurements

| R | Source I | Sense V |
|---|----------|---------|
| $R_A$ | 1-2 | 3-4 |
| $R_B$ | 2-3 | 4-1 |
| $R_C$ | 3-4 | 1-2 |
| $R_D$ | 4-1 | 3-2 |

Van der Pauw resistance measurements are performed by forcing a current across two adjacent electrodes and sensing the voltage drop across the sample in a parallel arrangement of electrodes.

The sheet resistance may be calculated from the ratio of V to I from the measured composition. In the case of a sample showing truly isotropic resistance, $R_A=R_B=R_C=R_D$. In the case of isotropic resistances, e.g., where $R_A=R_B$, the sheet resistance is determined by the average of the two measured resistances, as shown in Equation 1 below. For samples with anisotropic resistances (the x-direction and y-direction demonstrate different resistances), calculating the sheet resistance becomes more complicated, which will be addressed in the following paragraph. For all samples where $R_A \neq R_C$ and $R_B \neq R_D$, the measurement is void. Equation 2 shows how the bulk resistivity, ρ, is determined if the composition thickness, d, is known (typically resistivity is reported in Ω·cm, thus comprises the use of d in cm), which is derived from the original Van der Pauw theorem. Bulk resistivity, ρ, can then be used to calculate conductivity, σ (S·cm-1), which is inversely proportional (Equation 2).

$$R_S = \frac{R_A + R_B}{2} \qquad \text{Eqn. 1}$$

$$\rho = \frac{\ln(2)d}{\pi R_S} = \frac{1}{\sigma} \qquad \text{Eqn. 2}$$

Figure 2:
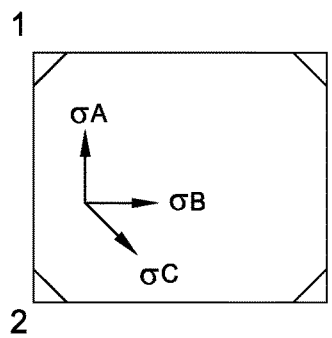
FIG. 2 illustrates an example van der Pauw measurement chip, according to some aspects of the present disclosure.
Figure 2:
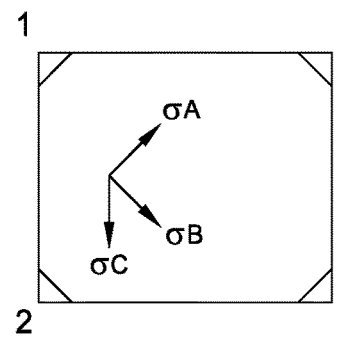

For cases where $R_A \neq R_B$, extracting conductivity values from the Van der Pauw equation becomes more difficult. In the case where the conductivity is not isotropic, the conductivity becomes a tensor value with x, y, and z dimensions. In the case of very thin compositions, an accurate conductivity value may be obtained by taking the square of the product of the perpendicular conductivity measurement values, as shown in Equation 3 below. This calculation is only true if the directions being measured align with the tensor axes of the conductivity. It is assumed that the larger of the two resistances measured by the technique is exactly along the lowest conductivity tensor, and the lower of the resistance measurements is exactly along the highest conductivity tensor, as shown in FIG. 2. FIG. 2 illustrates an example van der Pauw measurement chip. If there were a misalignment of the conductivity tensor with the electrode/sample orientation, as shown in FIG. 2 right side, an inaccurate conductivity value would be measured.

$$\sigma = \sqrt{\sigma_A \cdot \sigma_B} \qquad \text{Eqn. 3}$$

For the van der Pauw measurement chip of FIG. 2, the numbers correspond to axis of the measurement while the sigmaX notations ($\sigma_A$, $\sigma_B$, and $\sigma_C$) represent the conductivity tensor directions. A mismatch of sample axis and tensor axis, as in the sample on the right, leads to inaccurately measured conductivities. The van der Pauw printed electrodes with the Keithley 4200 SCS provide a suitable device test bed for the measurement of samples.

In an effort to control the measurement humidity effects, a small sample probe station may be used to exclusively connect to the Keithley 4200 SCS for accurate van der Pauw measurements on the Dropsens prefabricated electrodes.

Electrochemical Impedance Spectroscopy (EIS).

EIS uses a variable frequency alternating current source to probe the changes to a sample's impedance at different frequencies. Impedance, similar to a resistor, is the lag between an applied alternating current and the measured voltage change. Electrical circuit components respond in frequency dependent ways, which can be used to identify specific properties of a coating being measured. True ohmic resistors respond identically to direct current (DC) and alternating current (AC) sources, and thus show no frequency-dependent resistive response. Capacitors (as well as more complex electrical components) have a frequency-dependent response; at low frequencies the impedance is very high but at high frequencies the electrical impedance is lower. In the analysis of EIS data, a predicted model, known as the equivalence circuit model, is made composed of real and approximated electrical components to closely approximate the sample system. The model's calculated impedance spectra are then compared to the measured spectra.

The impedance response of the composition and its combined response as a capacitor and resistor may be determined. For goodness of fit, the fits may be obtained using the Gamry built in spectral fitting software. The Gamry program uses a $\chi 2$ fitting equation, Eqn. 4.

$$\chi 2 = \Xi[(Zmeas_{real}-Zfit_{real})^2 + (Zmeas_{imag}-Zfit_{imag})^2] \qquad \text{Eqn. 4}$$

A perfectly matched predicted and measured impedance spectrum will result in $\chi 2=0$. In at least one aspect, a value of $\chi 2<10^{-4}$ is an acceptable "good fit". In at least one aspect, when comparing two different equivalent circuit models, a difference of less than one third of the value is deemed indistinguishable.

Polymer Compositions

Compositions of the present disclosure may be formed by mixing a first polymer and a second polymer. A sulfonic acid may also be mixed with the first polymer and/or second polymer. Compositions of the present disclosure comprise compositions that have been cured and/or washed with a rinsing agent such as isopropyl alcohol and/or p-Toluenesulfonic acid.

Compositions of the present disclosure may be deposited onto a surface, such as a surface of a vehicle component, by any suitable method, such as dipping, spraying, brush coating, spin coating, roll coating, doctor-blade coating, or mixtures thereof. The composition may be cured before or after application to a vehicle component surface. For example, a composition may be deposited onto a vehicle component. Once deposited, the composition may be heated at about 70° C. for about 3 to about 4 hours to cure the composition. A higher temperature may be used to accelerate the curing process. Curing promotes evaporation of one or more solvents in the composition, such as xylenes, toluene, and/or water.

Microstructure and Composition Thickness.

Composition thickness may be measured with white light interferometry, from a cut step height. Composition surface microstructure may be observed with any suitable 3D laser scanning confocal microscope, such as a Keyence VK-X.

Example 1: PANI:DNNSA+Polyurethanes

The composition of Example 1 is shown in Table 2. Part A is a polyol with two or more hydroxyl groups. Part B is an isocyanate containing two or more isocyanate groups. Part C is PANI/DNNSA diluted with xylene and/or toluene to a percent solids of about 8%.

TABLE 2

|  |  | solid weights (g) | Actual Weights (g) | % of Composition |
|---|---|---|---|---|
| Polyol | Part A | 3.497792 | 7.92 | 49.97% |
| Isocyanate | Part B | 0.697792 | 1.58 | 9.97% |
| PANI:DNNSA in Toluene | Part C | 2.804 | 6.35 | 40.06% |
| Total Wgt |  | 7.000 | 15.850 |  |

Mixing Procedure for Example 1

PANI:DNNSA concentrate is diluted in xylene or toluene to a % solids of about 8% to form Part C. Part C is mixed with Part A thoroughly to make a uniform solution with substantially no aggregates or particles to form a Part A/Part C mixture. Part B is then added to the Part A/Part C mixture and mixed thoroughly. Although PANI:DNNSA concentrate of Example 1 is diluted in xylene or toluene to a % solids of about 8%, in at least one aspect, a polymer is present in a solvent to a % solids of between about 0.1 wt % and about 30 wt %, such as between about 1 wt % and about 15 wt %. Isocyanates comprise aryl isocyanates, aliphatic isocyanates, and cycloaliphatic isocyanates. In at least one aspect, isocyanates comprise toluene diisocyanate (TDI), methylene diphenyl diisocyanate (MDI), 1,6-hexamethylene diisocyanate (HDI), and mixtures thereof. Polyols comprise aryl polyols, aliphatic polyols, and cycloaliphatic polyols. In at least one aspect, polyols comprise C1-C15 polyol. In at least one aspect, Part A and Part B are synthesized or obtained commercially from Aptek (e.g., Aptek 2100), Huntsman Corporation (e.g., Huntsman 5750), BASF, Bayer AG, etc.

Application of Example 1

The composition of Example 1 is deposited onto a substrate surface, such as a surface of a vehicle component, via dipping, spraying, brush coating, spin coating, roll coating, doctor-blade coating, or mixtures thereof. Once applied, the composition is heated at about 70° C. for between about 3 to about 4 hours to cure the composition. In at least one aspect, a higher temperature may be used to accelerate the curing process.

Curing the composition promotes evaporation of the solvent (toluene, xylene, etc.) and controlled crosslinking of the polymers with suitable void space left by a solvent.

Figure 3:
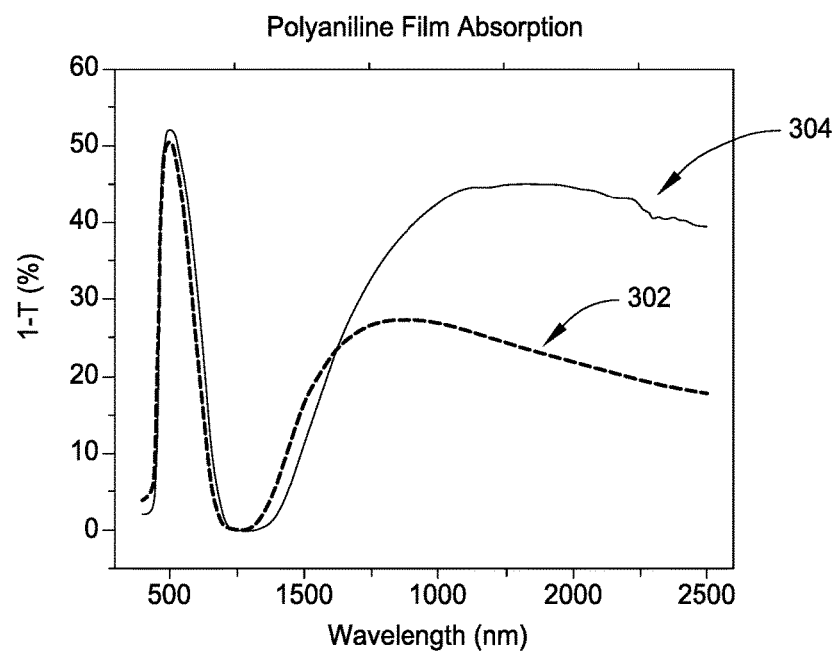
FIG. 3 illustrates absorptance of PANI compositions in the visible and near infrared regions, according to some aspects of the present disclosure.

FIG. 3 illustrates absorptance of PANI compositions in the visible and near infrared regions. Line 302 shows the absorptance of a composition comprising PANI:DNNSA:PTSA, while line 304 shows the absorptance of a composition comprising PANI:DNNSA. As shown in FIG. 3, the sharp peak at about 500 nm (of line 302 and line 304) corresponds to the bipolaron absorption while the broad absorption from about 1000-2500 nm results from infrared absorption by mobile holes. PANI's sharp peak at about 500 nm is attributed to a polaron having a DNNSA counterion. The free carrier part of the spectrum, i.e. the sigmoidal part that moves into the infrared region, is called the free carrier tail which is associated with conductivity of the polymer. A lower free carrier tail (or absence of a free carrier tail) indicates that a polymer has low (if any) conductivity. As shown in FIG. 3, the free carrier tail of a composition comprising PANI:DNNSA:PTSA (line 302) is lower than the free carrier tail of a composition comprising PANI:DNNSA (line 304) in the absence of PTSA.

Compositions of doped-PANI (e.g., line 304) differ from that of the solution (in the absence of doped-PANI) by the inclusion of a very broad spectral feature in the infrared window, e.g. the carrier tail. The bipolaronic absorption feature in the visible region originates from the same structural entities of that in the solution absorption albeit blue-shifted by about 0.45 eV. Without being bound by theory, this shifting may be due to interchain interactions, including parallel alignment of the chromophore dipole on adjacent polymer chains leading to H-like aggregation (which may be determined by emission spectroscopy).

Example 2: PEDOT:PSS in Acrylate Polymer

PEDOT:PSS is a polymer system that is soluble in polar solvents, such as water and DMSO. This solubility provides water soluble dispersions with second polymers such as epoxies and/or polyurethanes.

The resistance of Example 2 starts off close to 500Ω/☐ and drops to almost 100Ω/☐ by the third layer while remaining very thin. This formulation provides electrostatic dissipative applications with a low loading of PEDOT:PSS. The concentration of the PEDOT:PSS can be increased to further lower the resistance of the composition. In at least one aspect, a composition comprises between about 0.1% by weight (wt) and about 50 wt % of PEDOT:PSS, such as between about 1 wt % and about 25 wt %, such as between about 1 wt % and about 10 wt %, for example about 5 wt %.

Figure 4:
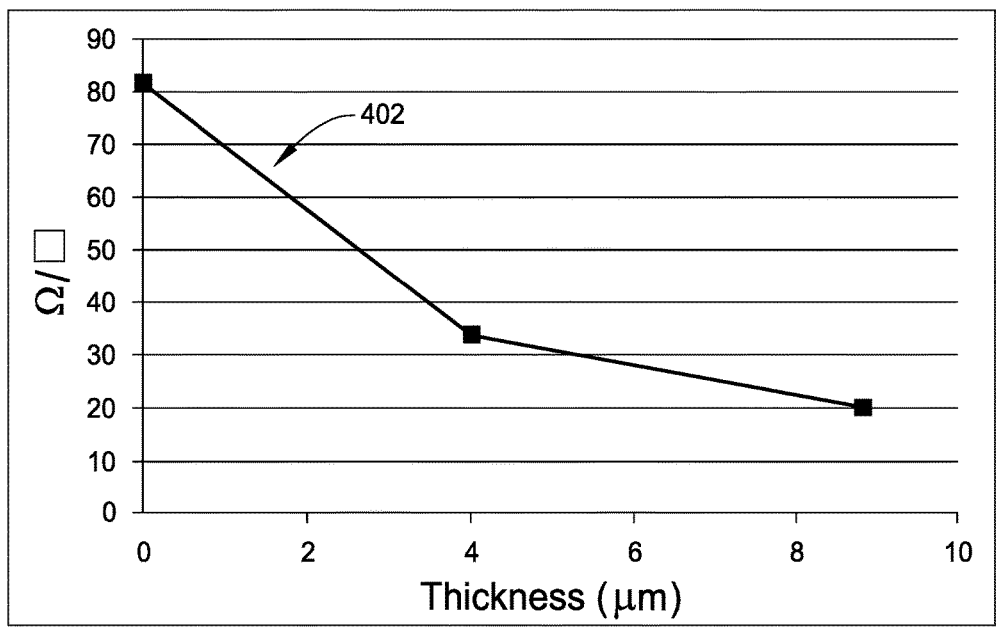
FIG. 4 illustrates resistance versus thickness of a PEDOT:PSS composition, according to some aspects of the present disclosure.

FIG. 4 illustrates resistance versus thickness of a PEDOT:PSS composition. As shown in FIG. 4, the resistance of the PEDOT:PSS (line 402) starts off low at about 70-80Ω/☐ with a dark blue composition and decreases upon increasing thickness to about 20Ω/☐ with a dark blue composition at a thickness of about 6 μm.

Rinse to Reduce Resistance

Compositions of the present disclosure may be rinsed, for example, after deposition onto a surface and before or after curing, with one or more rinsing agents. Rinsing agents comprise isopropyl alcohol (IPA), p-Toluenesulfonic acid, acetone, methanol, salts thereof, and mixtures thereof. In at least one aspect, a composition is coated onto a substrate and dipped into a solution containing one or more rinsing agents. In at least one aspect, a rinse comprises spraying a rinsing agent on a surface of a composition deposited on a substrate. In at least one aspect, a rinsing agent is sprayed onto a surface of a composition for between about 1 second and about 10 minutes, such as between about 30 seconds and about 2 minutes. In at least one aspect, a rinsing agent is sprayed onto a surface of a composition in an amount of between about 1 mL and about 25 kL, such as between about 100 L and about 1 kL. In at least one aspect, a composition having a higher resistance may be suitable for an application and, therefore, rinsing with a rinsing agent may be excluded. For example, resistance of an unrinsed PANI:DNNSA coating(s) may be sufficient for a particular use, and the unrinsed PANI:DNNSA coating(s) may still be cured.

An IPA rinse, for example, removes some of the excess acid, such as DNNSA. Acid removal promotes increased contact between polymer chains of the composition and reduced resistance of the composition. Rinse with a rinsing agent further promotes solubility of the composition in a variety of solvents. The increased solubility facilitates deposition of the composition onto a substrate because less solvent may be used for deposition as compared to unrinsed compositions. A reduced amount of solvent for deposition provides faster curing times and reduced costs of production.

EIS has been used to help quantify the effects of rinsing with a rinsing agent on PANI composition impedance. The capacitive nature of the composition decreased with additional rinsing (e.g., dipping) and was lowest for compositions dipped in IPA and then PTSA/PTSAM solutions. Compositions comprising PANI:DNNSA incorporated into epoxy compositions with rinsing showed promise as conductive compositions. In addition, PEDOT:PSS may be incorporated at even lower loadings (than typical PANI:DNNSA) to make conductive compositions.

Example 3: PANI:DNNSA 40% wt in Polyurethane Rinsed with IPA

Figure 5A:
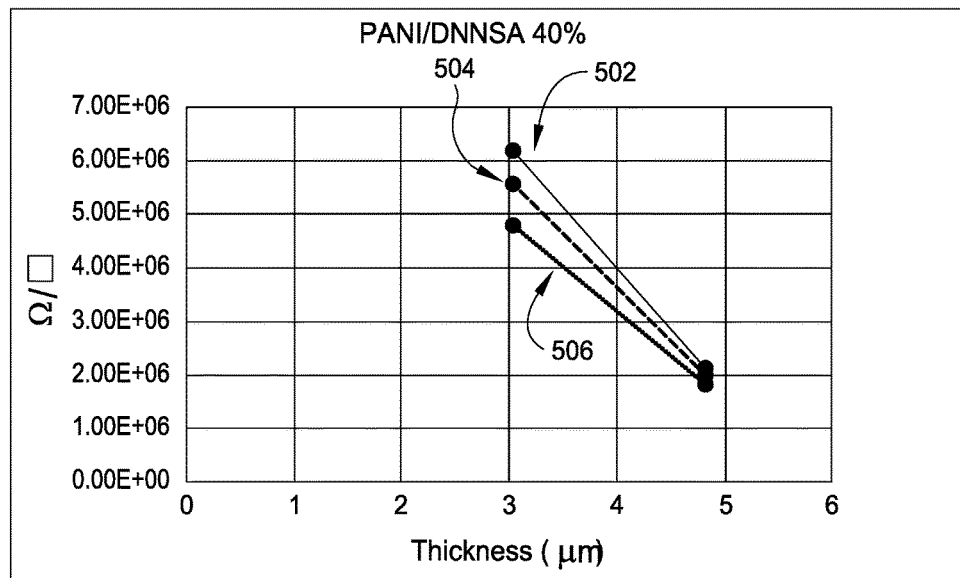
FIG. 5A illustrates resistance versus composition thickness for PANI:DNNSA 40% in polyurethane, according to some aspects of the present disclosure.
Figure 5B:
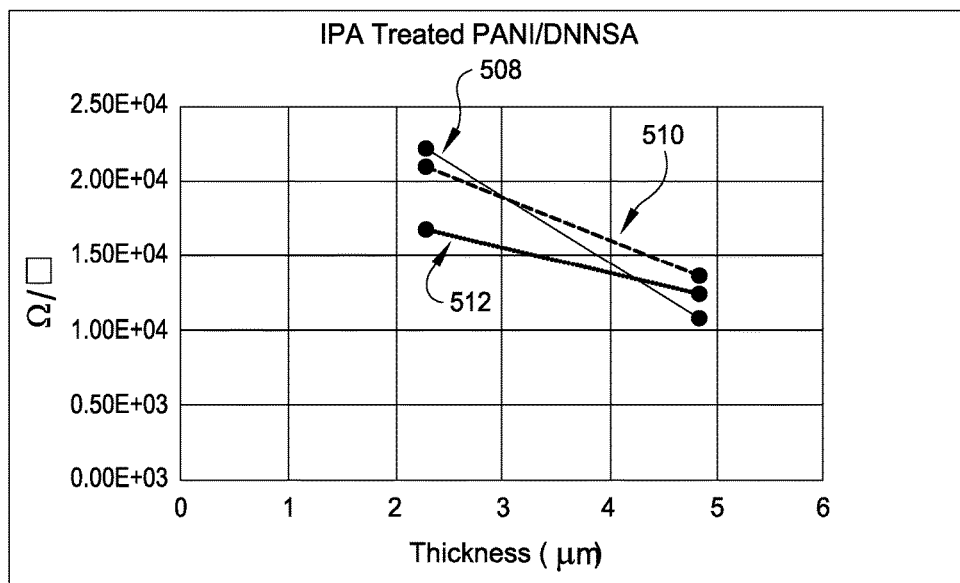
FIG. 5B illustrates resistance versus composition thickness for PANI:DNNSA 40% wt in polyurethane rinsed with IPA, according to some aspects of the present disclosure.

FIG. 5A illustrates resistance versus composition thickness for PANI:DNNSA 40% in polyurethane, while FIG. 5B illustrates resistance versus composition thickness for PANI:DNNSA 40% wt in polyurethane rinsed with IPA. As shown in FIG. 5A, resistance of the compositions for PANI:DNNSA 40% in polyurethane that were not rinsed with IPA (lines 502, 504, and 506) were in MΩ/☐ at thickness between about 3 μm and about 5 μm. However, as shown in FIG. 5B, the resistance of the compositions after IPA rinse (lines 508, 510, and 512) reduces substantially with the IPA wash to kΩ/☐ between thicknesses of about 2 μm and about 5 μm. As shown in FIGS. 5A and 5B, resistance of the compositions (lines 502, 504, 506, 508, 510, and 512) also reduces with increasing composition thickness.

Example 4: PANI:DNNSA Rinsed with Various Rinsing Agents

Figure 6:
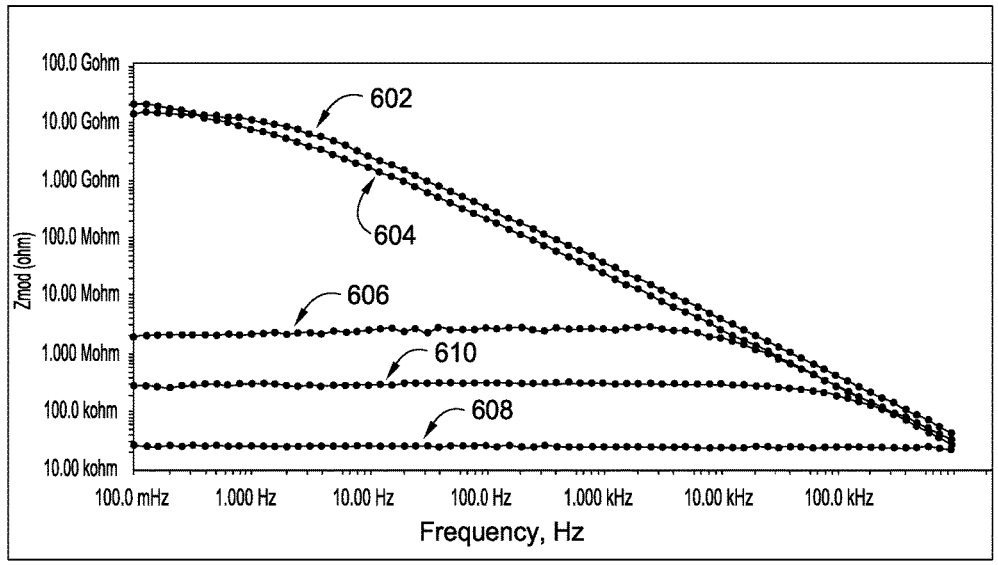
FIG. 6 illustrates a Bode plot of impedance spectra plotted as impedance versus frequency for a neat PANI:DNNSA composition, according to some aspects of the present disclosure.

FIG. 6 illustrates a Bode plot of impedance spectra plotted as impedance versus frequency for a neat PANI:DNNSA composition. The data for FIG. 6 was determined by EIS. Dipping treatments consisted of submersion into the noted rinsing agent or secondary dopant treatment for 10 s each. As shown in FIG. 6, impedance is highest for unrinsed PANI:DNNSA (line 602) and PANI:DNNSA rinsed with p-Toluenesulfonic acid (PTSA) (line 604). PANI:DNNSA rinsed with IPA (line 606) provides a composition with reduced impedance as compared to the compositions of lines 602 and 604. Furthermore, PANI:DNNSA sequentially rinsed with IPA, air dried and then rinsed with a solution of 1% PTSA/PTSAM in butoxyethanol (line 608) provides lower impedance than PANI:DNNSA sequentially rinsed with a solution of 1% PTSA/PTSAM in butoxyethanol, air dried and then rinsed with IPA (line 610), as well as the compositions of lines 602, 604, and 606.

As shown in FIG. 6, the high impedance (y axis in Ohms) measured for PANI:DNNSA compositions is analogous to the high DC resistivity. For the unrinsed sample (line 602), which each of the compositions begins as, the impedance drops substantially with increased frequency, which is characteristic of the leaky capacitor model (trickle through current limited by the high R regions between highly crystalline regions).

The change of the composition impedance from acting as a resistor and leaky capacitor to a purely resistive system is consistent with the observation that the dipping is creating a more interconnected polymer system (instead of isolated PANI crystal islands) and, accordingly, a lower resistance to electron transfer between areas of PANI, as shown in FIG.

6. The shrinking distance between highly conductive regions of PANI thus reduces the Rp value fit to the EIS data. This is further supported by considering the composition shrinkage (thickness) that occurs with secondary dipping, e.g. IPA followed by PTSA.

One sample not included in FIG. 6 is that of a composition dipped in a solution of DNNSA in IPA which measured a very low (~1 Ohm) and flat impedance. This would make the composition very conductive and responding purely as a conductor with no CPE character. While the composition was more conductive than its undipped precursor, it was not substantially better as EIS would suggest.

Figure 7:
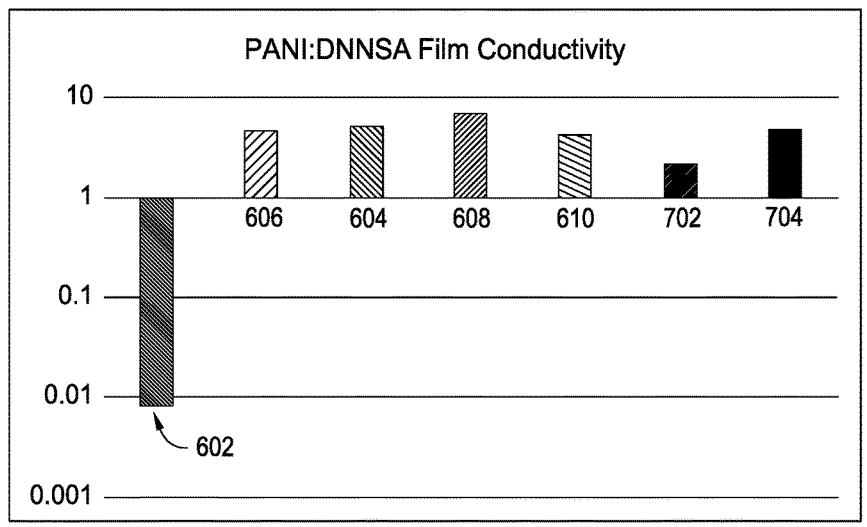
FIG. 7 is a bar graph illustrating relative conductivity of PANI:DNNSA compositions cast on interdigitated electrodes and treated with a rinsing agent, according to some aspects of the present disclosure.

FIG. 7 is a bar graph illustrating relative conductivity of PANI:DNNSA compositions cast on interdigitated electrodes and treated with a rinsing agent. As shown in FIG. 7, unrinsed PANI:DNNSA (bar 602) has a low conductivity as compared to PANI:DNNSA rinsed with IPA (bar 606), PANI:DNNSA rinsed with PTSA (bar 604), PANI:DNNSA rinsed with IPA followed by PTSA (bar 608), PANI:DNNSA rinsed with PTSA followed by IPA (bar 610), PANI rinsed with a mixture of DNNSA and IPA (bar 702), and a Thymol rinse (bar 704). Thus, impedance and conductivity of compositions of the present disclosure may be tuned to a desired impedance and conductivity by applying a rinsing agent to a surface of a composition.

Comparative Example: PANIPOL and PANIPLAST

Figure 8:
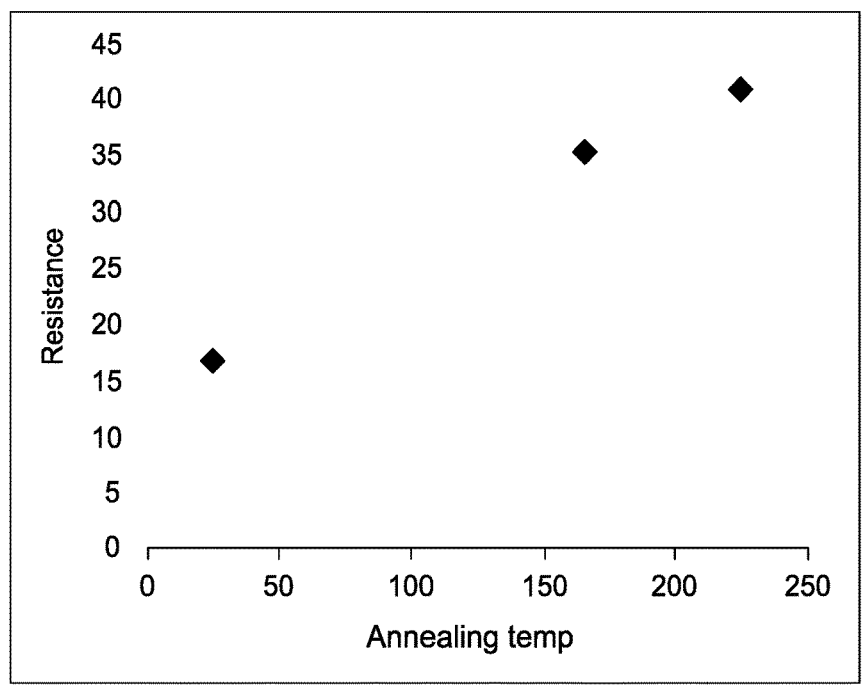
FIG. 8 illustrates resistance (in kOhms) versus annealing temperature for a PANIPOL composition cast from toluene, according to some aspects of the present disclosure.
Figure 9:
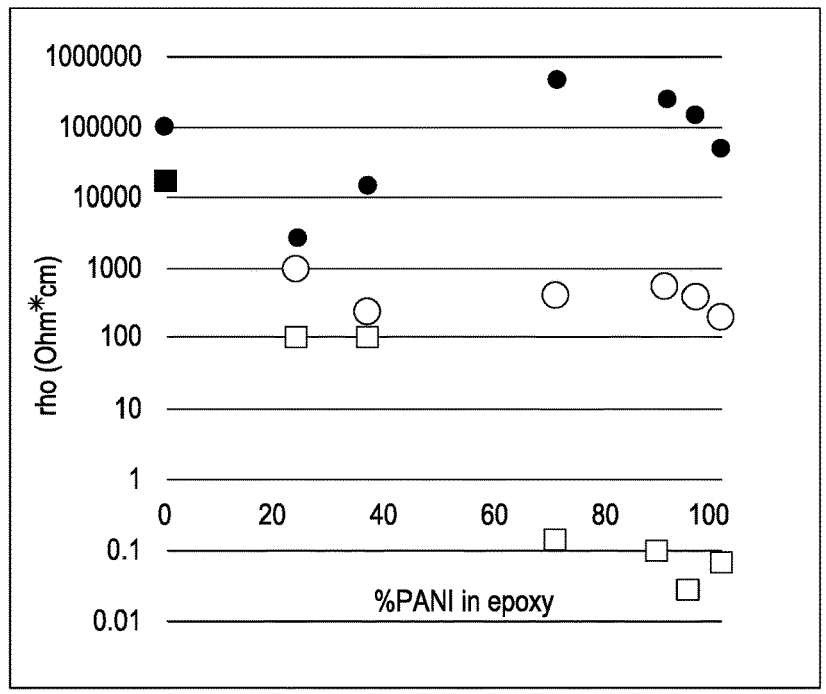
FIG. 9 illustrates resistivity of PANI:DNNSA in epoxy coating versus % PANI in epoxy and treated with various rinsing agents, according to some aspects of the present disclosure.

PANIPOL is a dodecylbenzene sulfonic acid (DBSA)-doped, highly conductive polymer (prior to composition rinsing, unlike PANI:DNNSA) that is slightly soluble in toluene and may be used in polyurethane coatings. Compositions comprising PANIPOL may be formed from dispersions of the polymer in toluene and xylene. The sheet resistances of these dispersions are 12.8 and 16.2Ω, respectively. The polymer is only slightly soluble in a number of solvents, such as xylenes and toluene, and thus casts a rough composition onto a substrate. The roughness of the compositions hinders "airworthiness" of PANIPOL compositions because the compositions are more susceptible to cracking, rendering underlying layers/substrate susceptible to chemical and UV damage. FIG. 8 illustrates resistance (in kOhms) versus annealing temperature for a PANIPOL composition cast from toluene. As shown in FIG. 8, an increase in annealing temperature increases the resistance of a PANIPOL composition (data points shown as solid diamonds).

Synthesis of PANIPOL may include isolating an insoluble and insulating powder of PANI:DBSA. Alternatively, synthesis of PANIPOL may include not crashing the polymer out of solution and casting compositions of the dissolved polymer from p-xylene. Typically these compositions measured a sheet resistance of several to hundreds of kΩ.

In one synthesis run in 2-butoxyethanol, similar to the PANI:DNNSA synthesis described above, the polymer was completely dried from solution (instead of crashing out of the xylene solution). However, these solids were found to be insoluble in a variety of solvents. Nonetheless, after being resuspended in a large amount of xylene and isolated by filtration, the composition appeared similar to the commercially available PANIPOL and dispensed as a composition which measured 14Ω.

The synthesized PANIPOL may be less conductive than the commercially available PANIPOL because crashing the polymer out of solution in water removes a critical amount of the counterion, DBSA. An alternate synthesis was designed around creating the polyaniline base and then redoping with DBSA. This synthesis led to a sufficiently conductive polymer paste. Conductivity values for these compositions are shown in Table 3.

TABLE 3

Conductivity values for PANI-b to PANI:DBSA samples

| Sample | σ (Scm$^{-1}$) |
|---|---|
| 1 | 6.729 |
| 2 | 5.754 |
| 3 in toluene | 3.672 |

Commercially available PANIPOL is slightly soluble in toluene and can be isolated by suspending in toluene and decanting off the dissolved polymer. This solution was diluted and compared to the absorption of a very dilute and filtered solution of newly synthesized PANI:DBSA, as described above. PANIPOL absorbs at a higher energy than the newly synthesized PANI:DBSA. The absorption peak is also broader for the newly synthesized PANI:DBSA, indicative of a loss of dopant. The singly-doped polaron state introduces a lower energy absorption at $\Omega_1$ eV, as well as an optically allowed transition to a state at CB-$\Omega_1$, while the double-doped bipolaron, has a slightly higher energy absorption at $\Omega_1'$. Thus, when considering the absorption, it is plausible that the broadening to a lower energy transition in the PANI:DBSA fill is the conversion (dedoping) of some of the bipolaron transitions to single polarons. This would mean the composition is losing DBSA and this may be the cause of the conductivity difference.

Efforts to rinse the PANI:DBSA compositions were performed but only modest conductivity increases were observed, as shown in Table 4. Note that the water dipped sample was on an otherwise high resistance composition. Composition treatment in water did show a significant change, which again may be due to removal of the DBSA which is soluble in water.

TABLE 4

Composition treatments and resistance changes in PANI:DBSA compositions.

| Treatment | PTSA | PTSA/PTSAM | MeOH | H$_2$O |
|---|---|---|---|---|
| Conductivity Increase | 2.3x | 1.5x | 0.3x | 100x |

Similar to PANIPOL, PANIPLAST is a composition of polyaniline and a polyamine/amide dopant. PANIPLAST also has limited solubility in ethylene glycol, xylene, water and methanol. PANIPLAST is a dispersion that is difficult to filter through a 0.25 micron filter. Coatings like PANIPLAST are conductive but need to be brush applied to a surface. A coating from a dispersion of 7.7 grams in 6.4 grams of water was applied to a 4"×6" panel and dried at 70° C. The PANIPLAST yielded a resistance between about 1 kOhms and about 2.2. kOhms.

Overall, the roughness of the deposited PANIPOL and PANIPLAST compositions hinders "airworthiness" of these compositions because the compositions are more susceptible to cracking, rendering underlying layers/substrate susceptible to chemical and UV damage. Furthermore, rinsing PANIPOL compositions only moderately decreases resistance of the compositions and does not increase the density of the compositions.

Example 5: Polyaniline into Epoxy

Conventional surface coatings lack compatibility with underlying surfaces and/or a polymer mixed with other components of the surface coating. For example, epoxy resins have many desirable physical properties but are nonetheless reactive to a large number of nucleophilic compounds, such as anilines, such as PANI. Undesired reactivity results in precipitation and/or agglomeration of byproducts. It has been discovered that dissolution of a reactive species such as polyaniline in a compatible solvent promotes dispersibility which reduces undesired reactivity with reactive surfaces and/or a polymer, such as polyurethane, mixed with the reactive species. Dissolution of the reactive species promotes formation of a compatible, airworthy composition that may be disposed onto a surface of a vehicle component. This aspect underscores surface coating compatibility with surrounding material in addition to having the desired physical properties for airworthiness. Suitable solvents for polyanilines comprise xylenes, toluene, benzene, and mixtures thereof. Suitable solvents for PEDOT:PSS comprise polar protic solvents such as water and DMSO.

For example, PANI:DNNSA was incorporated into a high temperature cure epoxy . . . . Solutions were manually mixed then placed in a Thinky mixer at 1000 rpm for 10 min. PANI:DNNSA was visibly crashing out of the epoxy solution (a very low viscosity solution). Solutions were dropcast onto 4-pt electrodes, with electrode spacing of 2 mm and length of 6 mm, and dried at 120° C. in air for an hour. Simple two point resistance measurements were made and the composition thickness measured to calculate the composition resistivity. FIG. 9 illustrates resistivity of PANI:DNNSA in epoxy coating versus % PANI in epoxy and treated with various rinsing agents. As shown in FIG. 9, resistivity of PANI:DNNSA:epoxy compositions decreases from as-cast composition (solid circles) to IPA dipped composition (hollow circles), IPA dipped composition followed by PTSA dip (solid squares), and IPA rinse followed by a second IPA rinse (hollow squares).

Prior to secondary treatments, PANI:DNNSA:epoxy compositions show no obvious trend relating polymer loading to conductivity. Even at PANI:DNNSA loadings of ~20% with no secondary treatment, the conductivity may fall into a sufficient conductivity threshold for some electrostatic dissipative coatings. After dipping the compositions in IPA, the compositions provide a trend of increasing conductivity with increasing PANI:DNNSA loading.

Furthermore, a measurable conductivity was obtained for the epoxy coating containing no PANI after the PTSA dip, which is possibly due to ionic conductivity, as opposed to electrical conductivity.

PANI:DNNSA may be mobile in the cured epoxy coating. Composition treatment, for example dipping, provides increased composition conductivity. Without being bound by theory, the increased conductivity of the PANI:DNNSA:epoxy coatings may be due to removal of excess aniline, DNNSA and/or rinsing agent-induced changes to the microstructure of the deposited composition.

An alternative method to temper the reactivity of polyaniline with epoxy comprises adding polyaniline slowly to an epoxy surface, followed by a slow increase of curing temperature before reaching a final curing temperature. Overall reactivity between PANI:DNNSA with epoxy may be further controlled by peak curing temperatures and/or curing times.

Example 6: Thermoplastics: PANI:DNNSA in Butvar B90 and PEDOT:PSS in Butvar B90

Butvar B90 is a tri-block polymer containing polyvinyl butyral (PVB), polyvinyl alcohol and polyvinyl acetate as shown below, where x, y, and z are each a positive integer.

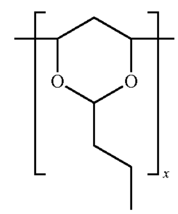

polyvinyl butyral 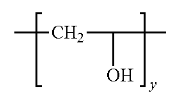 polyvinyl alcohol 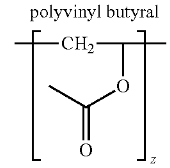 polyviny acetate

Butvar B90 may be used as a base resin in thermoplastic coatings, as well as combined with thermoset material(s) to make thermoset resins. In Example 6, PVB was combined with PEDOT:PSS and PANI:DNNSA as surface resistance (Ω/□) and pencil hardness were measured. Several samples also included the addition of a reactive epoxy component (e.g., EPON 1007-CT-55: a diglycidyl ether Bisphenol A) that reacts with the alcohol group of Butvar B90, which adds strength to the coating.

Solutions of PVB were made by dissolving 10% wt PVB into a premade solution of 40/60 methanol/toluene. A Teflon coated metallic stir bar was added to the flat-bottomed jar and placed to stir at ambient temperature for 1-3 hours until dissolved.

Samples were prepared by adding PVB solution into a flask and then adding any EPON or $H_3PO_4$ mixing in a Thinky mixer or by vortexer and allowing it to set for 30 minutes. A specific loading of PANI:DNNSA was added, and the samples were vortex mixed. Samples were then made by painting the coating onto glass slides with a small paint brush.

Initial formulations were begun with PEDOT:PSS, which were all very high resistance coatings, but PANI:DNNSA was added to the B90/EPON/surfactant mixture at 20% by weight and measured a resistance of 3.3 MΩ. In follow up studies, additional compositions were tested. The compositions tested are shown in Table 5 below.

TABLE 5

PVB, PANI:DNNSA: Concentration Variations for Example 6

| Sample | PANI:DNNSA | PVB | EPON | $H_3PO_4$ | Surface Resistance ($\Omega/\square$) | Pencil Hardness [a] | Color | Appearance |
|---|---|---|---|---|---|---|---|---|
| 1 | 0.185 | 0.357 | 0.357 | 0.100 | 156000 | 0 | Green | translucent, orange peal |
| 2 | 0.000 | 0.900 | 0.000 | 0.100 | 5000000 | 3 | Clear | translucent, orange peal |
| 3 | 0.500 | 0.400 | 0.000 | 0.100 | 9300 | 0 | Green | opaque, bumpy |
| 4 | 0.500 | 0.000 | 0.400 | 0.100 | NA | NA | NA | |
| 5 | 0.000 | 0.500 | 0.500 | 0.000 | 5000000 | 3 | White | opaque, bumpy |
| 6 | 0.500 | 0.000 | 0.500 | 0.000 | 712000 | 0 | Green | semiopaque |
| 7 | 0.246 | 0.754 | 0.000 | 0.000 | 48750 | 3 | Green | translucent, rough |
| 8 | 0.000 | 0.000 | 0.900 | 0.100 | NA | NA | NA | |
| 9 | 0.500 | 0.500 | 0.000 | 0.000 | 43750 | 0 | Green | opaque, rough |
| 10 | 0.250 | 0.000 | 0.750 | 0.000 | 389500 | 0 | Green | semiopaque, smooth glossy |

[a] = pencil hardness: the letter designation scale has been changed to a numerical scale (0-14). Pencil hardness results fell into either too soft to measure on the scale, a '0', or a '3'.

Thus, hardness of compositions of the present disclosure may be tuned by comprising polyvinyl butyral in one or more compositions, further improving "airworthiness" of compositions such as surface coatings due, at least in part, to increased hardness of the compositions. In at least one aspect, compositions of the present disclosure comprises about 25 wt % PANI:DNNSA and about 75 wt % polyvinyl butyral, such as Butvar B90. In at least one aspect, compositions of the present disclosure comprise about 6% PANI:DNNSA in polyvinyl butyral, with no EPON or phosphoric acid.

Example 7: Polyethylenedioxythiophene: Polystyrene Sulfonate (PEDOT:PSS) in a Sol-Gel PEDOT is a conductive polymer with a high intrinsic conductivity. It may be used as an electron-selective transport material in organic photovoltaics and may be used in coatings for static dissipation. For Example 7, commercially available PEDOT:PSS was incorporated into Boegel, a glycidyl-Si—Zr-containing solgel adhesion-promoting pretreatment for, for example, Alclad surfaces.

PEDOT:PSS was added and mixed on a vortex mixer to newly combined prepared solutions of the solgel. In some higher loading of PEDOT:PSS the solgel rapidly gelled, indicating a reaction between the epoxy moieties of the solgel and the conductive polymer.

Figure 10:
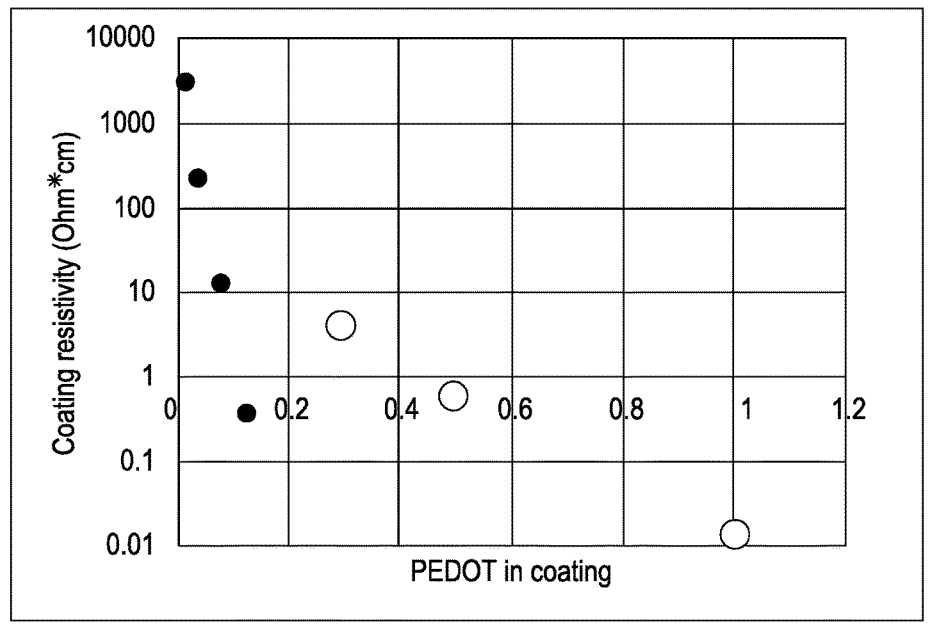
FIG. 10 illustrates resistivity of PEDOT:PSS compositions at different amounts of PEDOT:PSS in a composition, according to some aspects of the present disclosure.

FIG. 10 illustrates resistivity of PEDOT:PSS compositions at different amounts of PEDOT:PSS in a composition. As shown in FIG. 10, resistivity of an epoxy-based composition (solid circles) reduces sharply as the amount of PEDOT:PSS is increased. Resistivity of a sol-gel based composition (Boegel) also decreases with increased PEDOT:PSS content (hollow circles), but the decrease is not as sharp as compared to the epoxy-based compositions.

There are several observable trends in the data: (1) PEDOT:PSS loaded epoxy shows measureable conductivity at much lower loading thresholds (demonstrating a sub 16% IPN.). (2) Pure PEDOT has a conductivity approaching 100 S/cm. (3) The PEDOT:PSS formulations require no secondary treatments (such as IPA rinse) and also show a much lower loading threshold for creating conductive coatings.

Surfactants and PEDOT:PSS in Epoxy:

A high temperature cure epoxy resin was used to test the efficacy of several commercial dispersants to disperse PEDOT:PSS. A comparison between samples of PEDOT:PSS with loading levels ranging from 0.1% to 2.0% in epoxy containing a Lubrizol Solplus R700 dispersant to samples with no dispersant. The PEDOT:PSS in all samples was observed to phase separate, yet the Solplus containing samples showed a dramatic reduction in particle aggregation. Samples containing Solplus R700 were less resistive, particularly at low loading levels.

A comparison between dispersants at a single PEDOT:PSS loading level (1.0%): The dispersants being compared are all from Lubrizol Solplus, R700, R710 and DP700. Samples were prepared as described above (Example 7). Samples with R700 and R710 showed the best PEDOT:PSS dispersion (visually) while R710 had the lowest resistance (6.73 M$\Omega/\square$). For aqueous PEDOT:PSS solutions, R710 is sufficient to dispersing the polymer in organic-phase coating resins.

A polymer blend that gives higher conductivity as as-cast compositions was also investigated: PANI:DNNSA-PTSA with epoxy. These samples were prepared with loading levels of 0.02-0.2% and none had measureable resistances.

Multilayer Stacks

Aspects of the present disclosure comprise compositions deposited onto a substrate as multiple layers to form a multilayer stack. In at least one aspect, a multilayer stack provides a lower overall electrical resistance as compared to a single layer of the same composition and thickness. A multilayer stack may also provide increased strength of the overall coating/surface of, for example, a vehicle component.

A multilayer stack comprises one or more polymer layers, each layer independently selected from PANI:DNNSA, PEDOT:PSS, polyurethanes, acrylates, polyvinyl butyrals, and mixtures thereof. The one or more layers comprise a sulfonic acid, such as DNNSA.

A multilayer stack may also provide one or more conductive layers for use as a heating layer, e.g. deicing applications, as explained in more detail below. In at least one aspect, a multilayer stack comprises an outer protective layer disposed over an electrically conductive layer. As used herein, the term "outer" layer includes a layer having no additional layer deposited onto the outer layer, the outer layer being the layer directly exposed to the environment.

Example 8: Multilayer Stack

Example 8 is 4-layer multilayer stack where each layer is PANI:DNNSA that is rinsed with IPA after deposition of each layer. Thicknesses and surface resistance values for the multilayerstack after each deposition and rinsing are shown below in Table 6. Resistances below 100Ω/□ were achieved with the IPA treated samples.

TABLE 6

Average Resistance and thickness measurements for neat and IPA treated PANI/DNNSA.

| | | Sample 1 | Sample 2 | Sample 3 | Sample 4 |
|---|---|---|---|---|---|
| Layer 1 | Thickness (μm) | 17.034 | 13.7914 | 15.9964 | 15.2887 |
| | Resistance (Ω/□) | 5.37E+07 | 5.08E+07 | 5.68E+07 | 3.07E+07 |
| Layer 1 after IPA wash | Thickness (μm) | 9.6941 | 9.8854 | 9.6468 | 8.93 |
| | Resistance (Ω/□) | 3.35E+01 | 3.20E+01 | 2.77E+01 | 3.18E+01 |
| Layer 2 | Thickness (μm) | 94.234 | 65.024 | 57.404 | 38.862 |
| | Resistance (Ω/□) | 1.40E+07 | 1.79E+07 | 1.03E+07 | 1.36E+07 |
| Layer 2 after IPA wash | Thickness (μm) | 89.916 | 26.924 | 32.766 | 22.098 |
| | Resistance (Ω/□) | 1.31E+01 | 1.26E+01 | 1.31E+01 | 1.28E+01 |
| Layer 3 | Thickness (μm) | 108.204 | 52.07 | 57.912 | 44.704 |
| | Resistance (Ω/□) | 3.85E+06 | 3.43E+06 | 5.16E+05 | 1.50E+06 |
| Layer 3 after IPA wash | Thickness (μm) | 100.838 | 37.846 | 48.768 | 40.132 |
| | Resistance (Ω/□) | 1.33E+04 | 6.82E+03 | 1.69E+04 | 2.57E+04 |
| Layer 4 | Thickness (μm) | 136.906 | 67.31 | 75.184 | 72.39 |
| | Resistance (Ω/□) | 8.08E+04 | 4.87E+04 | 8.48E+04 | 1.35E+05 |
| Layer 4 after IPA wash | Thickness (μm) | 108.966 | 44.45 | 51.054 | 64.008 |
| | Resistance (Ω/□) | 5.70E+02 | 5.70E+01 | 7.33E+01 | 1.80E+02 |

Composition Applications

Non-limiting examples for uses of compositions of the present disclosure comprise uses as a thermoplastic and/or as a component of prepreg material. For prepreg material, compositions of the present disclosure may be applied onto and/or impregnated into fiber materials composed of graphite, fiberglass, nylon, Kevlar® and related materials (for example, other aramid polymers), polyethylenes, among others.

Compositions of the present disclosure may be deposited onto a surface of a substrate, such as a vehicle component. Vehicle components include a structural component such as a panel or joint of an aircraft, automobile, etc. A vehicle component comprises a nose, a fuel tank, a tail cone, a panel, a coated lap joint between two or more panels, a wing-to-fuselage assembly, structural aircraft composite, fuselage body-joint, wing rib-to-skin joint, and/or other internal component.

Compositions may be deposited onto a surface of a substrate by any suitable deposition method. Deposition methods include, but are not limited to, dipping, spraying, brush coating, spin coating, roll coating, doctor-blade coating, and mixtures thereof. Compositions of the present disclosure may be deposited onto a substrate, such as a surface of a vehicle component, at a range of thicknesses, such as between about 0.1 μm and about 20 mm, such as between about 1 μm and about 10 μm, such as between about 1 μm and about 8 μm, such as between about 2 μm and about 6 μm. Composition thickness is utilized to tune conductivity and resistance of a deposited composition. Composition thickness may also be utilized to further tune "airworthiness" properties (such as rain erosion and resistance to sand and hail damage) of the composition and resulting coated substrate.

After a composition is deposited onto a substrate, the composition may be cured at any suitable temperature, e.g. to evaporate solvent. Curing may be performed using any suitable curing apparatus. For curing, a temperature of the composition may be raised gradually to a peak curing temperature at which the peak curing temperature remains constant for a period of time. A peak curing temperature may be between about room temperature and about 200° C., such as between about 70° C. and about 150° C. Compositions may be cured for a period of time of between about 1 second and about 48 hours, such as between about 1 minute and about 10 hours.

Spraying to Deposit a Composition onto a Substrate:

One or more polymers is mixed with a suitable solvent (e.g., xylenes, toluene, water, etc.) and sprayed on top of a substrate until a sufficient film thickness is achieved to obtain a desired surface resistance. The solvent may then evaporate at room temperature forming a cured composition layer on the substrate.

Figure 11:
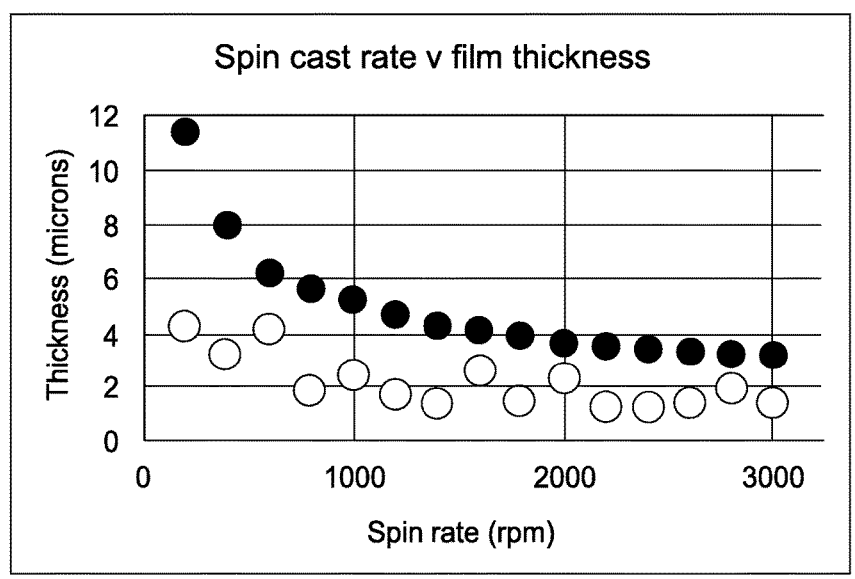
FIG. 11 illustrates spin rate versus composition thickness, according to some aspects of the present disclosure.

Spin Coating to Deposit a Composition onto a Substrate:

Composition thickness is utilized to fine tune conductivity and resistance of a deposited composition by, for example, spincoating PANI:DNNSA onto substrates at different chuck rotations. FIG. 11 illustrates spin rate versus composition thickness. As shown in FIG. 11, untreated compositions (solid circles) are highly dependent on the casting spin rate. Interestingly, the difference in final composition thickness diminishes after the compositions have been treated (dipped in rinsing agent) (open circles). In at least one aspect, compositions of the present disclosure are deposited by spin coating at a spin rate of between about 100 rotations per minute (rpm) and about 4,000 rpm, such as between about 1,000 rpm and about 3,000 rpm.

Figure 12:
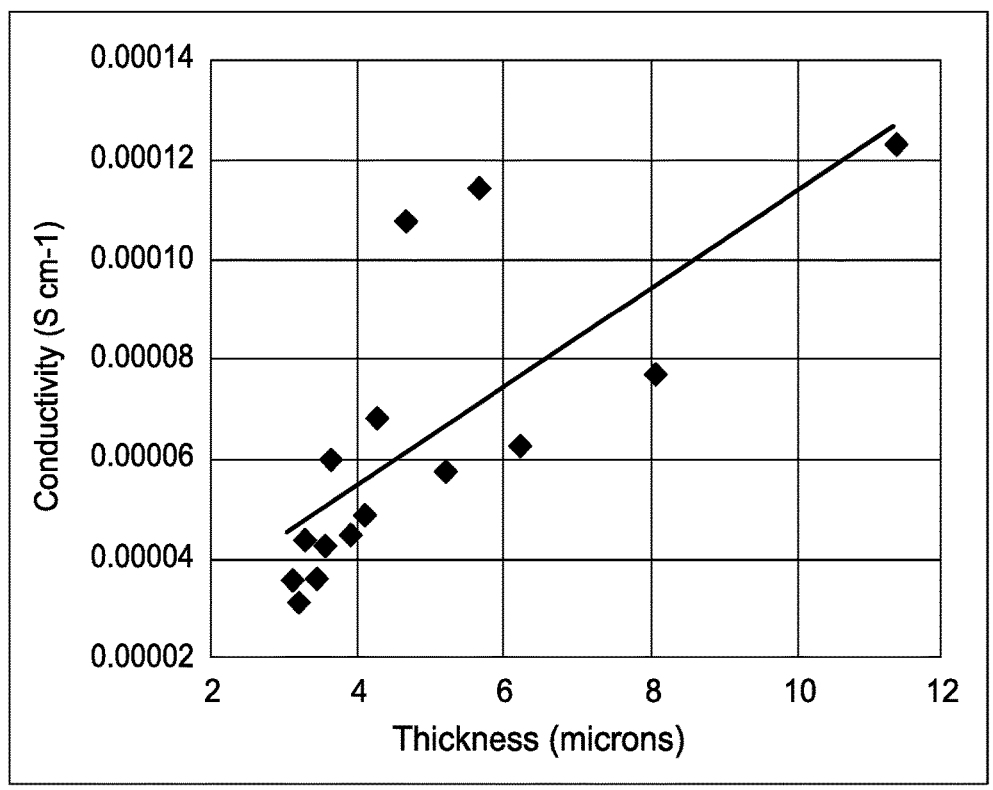
FIG. 12 illustrates conductivity versus thickness of as-deposited PANI:DNNSA films onto a substrate, according to some aspects of the present disclosure.

FIG. 12 illustrates conductivity versus thickness of as-deposited PANI:DNNSA films onto a substrate. Conductivity was again measured as a square resistance adjusted for the measurement dimensions. As shown in FIG. 12, conductivity has a linear trend as it increases with increasing thickness of the deposited composition (data points shown as solid diamonds). Furthermore, a lack of correlation between conductivity and thickness for rinsing agent-treated (e.g., IPA rinse) samples was also observed (not shown in FIG. 12).

Deicing:

After depositing one or more compositions of the present disclosure onto a component, such as a vehicle component, (and optional curing), the component may be "deiced" if, for example, harsh weather conditions have resulted in accumulation of ice on one or more components. Because compositions of the present disclosure are conductive, application of a voltage to a surface containing the composition will result in increased temperature of the surface and melt a portion of the ice accumulated on the surface. In at least one aspect, a voltage is applied to a surface containing one or more compositions of the present disclosure that provides complete melting of ice accumulation on the surface. In at least one aspect, a voltage is applied to a surface containing one or more compositions of the present disclosure that provides partial melting of ice accumulation on the surface such that the partially melted ice accumulation slides off of the vehicle component.

In at least one aspect, deicing comprises contacting any suitable AC/DC voltage generator with a surface containing one or more compositions of the present disclosure, and providing an AC voltage to the one or more compositions. Contacting an AC voltage generator with a surface containing one or more compositions (as a resistor) of the present disclosure provides resistive heating of at least the surface and may provide resistive heating of one or more layers of a vehicle component. In at least one aspect, deicing comprises providing voltage to a surface containing one or more compositions of the present disclosure by electrically generating components of an aircraft. For example, an aircraft engine is switched to the active mode and the AC power provided by an aircraft engine transmits to a surface of the aircraft which deices one or more surfaces of components of the aircraft. These aspects provide intrinsic deicing of an aircraft without a need to apply an external voltage generator to an aircraft component surface.

In at least one aspect, methods comprise providing an AC voltage to a surface at between about 10 Hertz and about 2000 Hertz, such as between about 200 Hertz and about 600 Hertz, for example about 400 Hertz. In at least one aspect, methods comprise providing an AC voltage to a surface at between 10 volts and about 2000 volts, such as between about 100 volts and about 400 volts, for example about 200 volts. Methods comprise adjusting the AC voltage with one or more transformers. Methods comprise adjusting the AC voltage into DC voltage with one or more rectifiers. Methods comprise adjusting the DC voltage into AC voltage with one or more oscillators.

Radome and Other Electrostatic Dissipation:

In an aircraft, a radar is present behind the nose of the aircraft. The nose often times builds up a form of static electricity known as precipitation static (P-static), which causes electrostatic interference with the radar in addition to brush discharge events causing damage to a coating on the outer surface of the aircraft. Electrostatic interference with the radar results in communication interference between the aircraft and the control tower on the ground as well as interference with detection of other aircraft in the sky. P-static further causes electrostatic interference with other components of an aircraft, for example, components that contain antenna(s). Furthermore, static charge often builds inside of a fuel tank of an aircraft which may affect fuel tank function.

If the aircraft is a fighter jet, for example, the canopy of the fighter jet often builds static charge, which causes static interference of radar(s) and antenna(s).

After depositing one or more compositions of the present disclosure onto a vehicle component (and optional curing), the one or more compositions electrostatically dissipate static electricity such as P-static accumulated at a location on the aircraft, such as a nose of the aircraft. The electrostatic dissipation of static electricity provides reduced or eliminated electrostatic interference with a radar of the aircraft and reduced or eliminated brush discharge events resulting in reduced or eliminated damage to a coating on an outer surface of an aircraft. Compositions of the present disclosure further provide reduced or eliminated electrostatic interference with other components of an aircraft, such as components that contain antenna(s). If compositions of the present disclosure are coated inside of a fuel tank, the one or more compositions provide reduced or eliminated static charge buildup inside the fuel tank.

Airworthiness:

In addition to an inability to dissipate charge buildup, conventional coatings are not otherwise "airworthy". For example, performance as to durability parameters such as rain erosion, resistance to UV light, resistance to high temperature, resistance to low temperature, and resistance to sand and hail damage are insufficient for conventional surface coatings on a surface of a vehicle such as an aircraft. Furthermore, for coatings of a canopy of a fighter jet and/or windshield/window of a commercial aircraft or fighter jet, coatings on these surfaces must be substantially clear to promote visibility through the surfaces. Compositions of the present disclosure are "airworthy" and improve upon one or more parameters of airworthiness (as compared to conventional coatings) such as rain erosion, resistance to UV light, resistance to high temperature, resistance to low temperature, resistance to sand and hail damage, and visibility.

Regarding visibility, conventional coatings often have low visible light transmittance. Visible light transmittance is the amount of light in the visible portion of the electromagnetic spectrum that passes through a material. A higher visible light transmittance means there is more light passing through a material into an adjacent space. Overall visible light transmittance of a window or canopy is influenced by the glazing type, the number of panes, and any coatings. Visible light transmittance ranges from above 90% for uncoated water-white clear glass to less than 10% for highly reflective coatings on tinted glass. Compositions of the present disclosure provide visible light transmittance of above about 50%, such as above about 60%, such as above about 70%, such as above about 80%, such as above about 90%.

In addition, if a conventional coating is mixed with additional chemicals to improve one or more desired physical properties of the coating, such as conductivity, the coating is often incompatible with the additional chemicals, negating desired physical properties of the additional chemicals added to the coating. Conventional coatings are also often incompatible with underlying surfaces/coatings leading to adhesion degradation at the coating-coating interface. In addition to the aforementioned applications and benefits, compositions and methods of the present disclosure provide controlled formation of electrostatically dissipative, airworthy compositions.

Compositions and methods of the present disclosure provide low resistance compositions (rinsed in a variety of rinsing agents), due at least in part to the removal of excess acid and a densification of the composition increasing the electrical percolation. Contrary to results using DNNSA, removal of excess DBSA prior to composition casting leads to high resistance compositions.

PANI and PEDOT:PSS show promise as conductive polymers that can be formulated into compositions deposited onto a vehicle component. Compositions of the present disclosure, such as compositions containing PVBs (polyvinyl butyrals), are robust, easy to work with, meet electrostatic dissipative resistances, and are versatile to apply.

Furthermore, as compared to conventional ionic based coatings, compositions and methods of the present disclosure provide reduced surfactant leach out over time in part because amounts of surfactant are reduced in the compositions of the present disclosure as compared to conventional ionic based coatings. In addition, sulfonic acids of the present disclosure leach from the formulations to a much lesser extent than conventional surfactants of conventional ionic based coatings.

Furthermore, as compared to conventional carbon black-filled coatings, compositions and methods of the present disclosure provide reduced resistive drift over time. Conventional coatings often contain substantial amounts of carbon additives (such as carbon black, carbon nanotubes, C60-bucky balls, graphene, etc.) to a coating in order to increase conductivity of the coating. Compositions of the present disclosure provide compositions with reduced or eliminated amounts of carbon additives present in the coatings, which reduces the overall weight of a coating while maintaining sufficient electrical properties.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope of the described aspects. The terminology used herein was chosen to, for example, best explain the principles of the aspects, the practical application or technical improvement over technologies found in the marketplace, or to enable others of ordinary skill in the art to understand the aspects disclosed herein.

As used herein, a "vehicle component" comprises any component of a vehicle, such as a structural component, such as a panel or joint, of an aircraft, automobile, etc. The vehicle component comprises a nose, a fuel tank, a tail cone, a panel, a coated lap joint between two or more panels, a wing-to-fuselage assembly, structural aircraft composite, fuselage body-joint, wing rib-to-skin joint, and/or other internal component. Vehicle components also comprise any suitable component of an automobile, marine vehicle, wind turbine, housing/ground structure, drilling apparatus, and the like.

As used herein, the term "composition" includes, but is not limited to, mixtures, reaction products, and films/layers, such as thin films, that may be disposed onto a surface, such as a surface of a vehicle component.

While the foregoing is directed to aspects of the present disclosure, other and further aspects of the present disclosure may be devised without departing from the basic scope thereof. Furthermore, while the foregoing is directed to polymers, compositions, and methods as applied to the aerospace industry, aspects of the present disclosure may be directed to other applications not associated with an aircraft, such as applications in the automotive industry, marine industry, energy industry, wind turbines, and the like.

What is claimed is:

1. A method of heating a vehicle component, comprising:
   depositing a composition onto a vehicle component, the composition comprising:
     a first polymer;
     a second polymer; and
     at least one of a naphthyl sulfonic acid, an anthracenyl sulfonic acid, and a pyrenyl sulfonic acid; and
   applying a voltage to a surface of the composition disposed on the vehicle component.

2. The method of claim 1, wherein applying the voltage to the surface of the composition at least partially melts solid water disposed on a surface of the vehicle component.

3. The method of claim 1, wherein the voltage is an alternating current voltage of between about 10 Hertz and about 2000 Hertz and/or between about 10 volts and about 2000 volts.

4. The method of claim 3, wherein the voltage is an alternating current voltage of between about 200 Hertz and about 600 Hertz.

5. The method of claim 3, wherein the voltage is an alternating current voltage of between about 100 volts and about 400 volts.

6. The method of claim 3, further comprising adjusting the alternating current voltage with one or more transformers.

7. The method of claim 1, wherein the vehicle component is selected from the group consisting of a nose, a fuel tank, a tail cone, a panel, a coated lap joint between two or more panels, a wing-to-fuselage assembly, a structural aircraft composite, a fuselage body-joint, a wing rib-to-skin joint, and/or other internal component.

8. The method of claim 7, wherein the first polymer is selected from a polyaniline, a poly(ethylenedioxythiophene), a poly(styrenesulfonate), or mixtures thereof, and the second polymer is selected from a polyurethane, a polyvinyl butyral, a polyacrylate, an epoxy, a glycidyl-Si-Zr-containing solgel, a polyester, a phenoxy resin, a polysulfide, or mixtures thereof.

9. The method of claim 1, wherein the second polymer comprises a polyurethane, a polyvinyl butyral, a polyacrylate, an epoxy, a glycidyl-Si-Zr-containing solgel, a polyester, a phenoxy resin, a polysulfide, or mixtures thereof.

10. The method of claim 9, wherein the second polymer is a polyurethane or a polyvinyl butyral.

11. The method of claim 10, wherein the composition comprises a naphthylsulfonic acid that is dinonylnaphthylsulfonic acid.

12. The method of claim 1, wherein the first polymer is a mixture of a poly(ethylenedioxythiophene) and a poly(styrenesulfonate), wherein the mixture is between about 1 wt % and about 50 wt % of the composition.

13. The method of claim 12, wherein the second polymer is an epoxy.

14. The method of claim 1, wherein the composition has a visible light transmittance of greater than about 50%.

15. The method of claim 1, wherein the composition comprises a fiber material comprising graphite, fiberglass, nylon, polyethylene, or mixtures thereof.

16. The method of claim 1, wherein the composition is a layer having between about 0.1 μm and about 10 μm thickness.

17. A method of heating a vehicle component, comprising:
   applying a voltage to a composition disposed on the vehicle component, the composition comprising:
     a first polymer;
     a second polymer; and
     at least one of a naphthyl sulfonic acid, an anthracenyl sulfonic acid, and a pyrenyl sulfonic acid.

18. The method of claim 17, wherein applying the voltage to the composition at least partially melts solid water disposed on a surface of the vehicle component.

19. The method of claim 17, wherein the voltage is an alternating current voltage of between about 10 Hertz and about 2000 Hertz and/or between about 10 volts and about 2000 volts.

20. The method of claim 19, wherein the voltage is an alternating current voltage of between about 200 Hertz and about 600 Hertz.

21. The method of claim 19, wherein the voltage is an alternating current voltage of between about 100 volts and about 400 volts.

22. The method of claim 19, further comprising adjusting the alternating current voltage with one or more transformers.

23. The method of claim 17, wherein the vehicle component is selected from the group consisting of a nose, a fuel tank, a tail cone, a panel, a coated lap joint between two or more panels, a wing-to-fuselage assembly, a structural aircraft composite, a fuselage body-joint, a wing rib-to-skin joint, and/or other internal component.

24. The method of claim 17, wherein the first polymer is selected from a polyaniline, a poly(ethylenedioxythiophene), a poly(styrenesulfonate), or mixtures thereof.

25. The method of claim 24, wherein the first polymer is a poly(ethylenedioxythiophene).

26. The method of claim 24, wherein the first polymer is a poly(styrenesulfonate).

27. The method of claim 24, wherein the composition is a layer having a thickness of between about 0.1 μm and about 10 μm.

28. The method of claim 24, wherein the second polymer is selected from a polyurethane, a polyvinyl butyral, a polyacrylate, an epoxy, a glycidyl-Si-Zr-containing solgel, a polyester, a phenoxy resin, a polysulfide, or mixtures thereof.

29. The method of claim 28, wherein the composition is a layer having a thickness of between about 0.1 μm and about 10 μm.

30. The method of claim 28, wherein the second polymer is a polyurethane or a polyvinyl butyral.

31. The method of claim 28, wherein the second polymer is an epoxy.

32. The method of claim 17, wherein the second polymer is selected from a polyurethane, a polyvinyl butyral, a polyacrylate, an epoxy, a glycidyl-Si-Zr-containing solgel, a polyester, a phenoxy resin, a polysulfide, or mixtures thereof.

33. The method of claim 32, wherein the composition comprises a naphthylsulfonic acid that is dinonylnaphthylsulfonic acid.

34. The method of claim 17, wherein the first polymer is a mixture of a poly(ethylenedioxythiophene) and a poly(styrenesulfonate), wherein the mixture is between about 1 wt % and about 50 wt % of the composition.

35. The method of claim 17, wherein the composition has a visible light transmittance of greater than about 50%.

36. The method of claim 17, wherein the composition comprises a fiber material comprising graphite, fiberglass, nylon, polyethylene, or mixtures thereof.

37. The method of claim 17, wherein the composition comprises a naphthylsulfonic acid that is dinonylnaphthylsulfonic acid.

* * * * *

UNITED STATES PATENT AND TRADEMARK OFFICE
CERTIFICATE OF CORRECTION

PATENT NO. : 10,100,240 B2
APPLICATION NO. : 15/252029
DATED : October 16, 2018
INVENTOR(S) : Rebecca A. Callahan et al.

Page 1 of 1

It is certified that error appears in the above-identified patent and that said Letters Patent is hereby corrected as shown below:

In the Claims

In Column 36, Line 21, in Claim 8, after "from" insert -- the group consisting of --.

In Column 36, Line 22, in Claim 8, delete "or" and insert -- and --, therefor.

In Column 36, Line 23, in Claim 8, after "from" insert -- the group consisting of --.

In Column 36, Line 26, in Claim 8, delete "or" and insert -- and --, therefor.

Signed and Sealed this
Twenty-sixth Day of February, 2019

Andrei Iancu
*Director of the United States Patent and Trademark Office*